United States Patent [19]
Gillett

[11] Patent Number: 5,497,471
[45] Date of Patent: Mar. 5, 1996

[54] HIGH PERFORMANCE COMPUTER SYSTEM WHICH MINIMIZES LATENCY BETWEEN MANY HIGH PERFORMANCE PROCESSORS AND A LARGE AMOUNT OF SHARED MEMORY

[75] Inventor: John B. Gillett, Woodstock, N.Y.

[73] Assignee: International Business Machines Corporation, Armonk, N.Y.

[21] Appl. No.: 339,512

[22] Filed: Nov. 14, 1994

Related U.S. Application Data

[63] Continuation of Ser. No. 675,583, Mar. 26, 1991, abandoned.

[51] Int. Cl.$^6$ ............................ G06F 1/16; H05K 7/00
[52] U.S. Cl. .................. 395/425; 361/688; 361/733; 361/803; 395/550; 395/200.01; 395/280; 364/271.5; 364/927.83; 364/DIG. 2
[58] Field of Search ................................ 395/200, 325, 395/425, 550; 361/733, 803, 688

[56] References Cited

U.S. PATENT DOCUMENTS

| | | |
|---|---|---|
| 4,237,546 | 12/1980 | Wells . |
| 4,571,663 | 2/1986 | McPherson .................... 361/393 |
| 4,868,712 | 9/1989 | Woodman ....................... 361/388 |
| 5,058,053 | 10/1991 | Gillett . |
| 5,060,111 | 10/1991 | Takashima ...................... 361/384 |
| 5,063,475 | 11/1991 | Balan ............................. 361/384 |
| 5,150,279 | 9/1992 | Collins et al. .................. 361/393 |

FOREIGN PATENT DOCUMENTS

| | | |
|---|---|---|
| 0213205 | 3/1987 | European Pat. Off. . |
| 0335482 | 10/1989 | European Pat. Off. . |
| 0403288 | 12/1990 | European Pat. Off. . |

OTHER PUBLICATIONS

Proceedings IEEE Int. Conf. on Circuits and Computers, Sep. 1982, pp. 60–62, Trujillo, "Implementation of a Fully Reconfigurable Mul".

40th Elec. Component Conf., May 1990, pp. 525–533, Akihiro, "Packaging Technology for the NEC SX–3/SX–X Supercomputer".

Gillett, "Integrated Circuit Chip Package Having Signal Input/Output Connections Located at Edges of the Substrate", Patent Application Serial No. 07/675,243, filed Mar. 26, 1991.

*Primary Examiner*—Ken S. Kim
*Attorney, Agent, or Firm*—Floyd A. Gonzalez; James E. Murray

[57] ABSTRACT

A new machine design minimizes latency between many high performance processors and a large amount of shared memory. Wire length, latency and skew are minimized by stacking edge connected modules (ECMs). The ECMs are characterized by signal input/output (I/O) pads on three edges, the two opposing inside connector edges and the third global connector edge. The ECMs support multiple processors per module, a plurality of basic storage modules (BSMs) per module, and portions of request and response switches per module. A plurality of processor ECMs and request switch ECMs are stacked in a first stacks and a plurality of BSM ECMs and response switch ECMs are stacked in a second stack. The two stacks are arranged adjacent one another with the request switch ECMs above or below the processor ECMs and the response switch ECMs below or above the BSM ECMs so that the response switch ECMs are adjacent the processor ECMs and the request ECMs are adjacent the BSM ECMs. The data flow from a processor to addressed memory and back to the processor is unidirectional about a loop defined by connections on the inside edges of the ECMs. The stacks as described form a subsystem which may be used as a stand-alone system or interconnected with other subsystems via the global connectors connected to the third edges of the ECMs. The global connectors allow the processors of one subsystem to be connected to the BSMs of another subsystem.

22 Claims, 18 Drawing Sheets

HIGH PERFORMANCE COMPUTER SYSTEM WHICH MINIMIZES LATENCY BETWEEN MANY HIGH PERFORMANCE PROCESSORS AND A LARGE AMOUNT OF SHARED MEMORY

CROSS-REFERENCE TO RELATED APPLICATIONS

This application is a continuation of application Ser. No. 07/675,583, filed Mar. 26, 1991, and now abandoned. The invention described in this application is related in subject matter to U.S. Pat. No. 5,058,053 issued Oct. 15, 1991 for "High Performance Computer System" by John B. Gillett and U.S. Pat. No. 5,168,347 issued Dec. 1, 1992 for "Integrated Circuit Chip Package Having Signal Input/Output Connections Located at Edges of the Substrate" by John B. Gillett, application Ser. No. 07/873,520 filed Apr. 21, 1992, now issued U.S. Pat. No. 5,168,347. Both of said applications are assigned to the assignee of this application, and the disclosures thereof are incorporated herein by reference.

BACKGROUND OF THE INVENTION

1. Field of the Invention

The present invention generally relates to high performance computer systems and, more particularly, to a machine design which combines superior system organization and packaging structure for maximizing performance.

2. Description of the Prior Art

Increasing demand for computer power has outstripped the capability of single processors (uniprocessors) to perform. High performance computers now require many processors operating in parallel and sharing the same main memory; i.e., so-called tightly coupled parallel processors. In addition, numerically intensive computing applications are growing, placing a requirement for vector processing capability at very high speeds.

An example of a tightly coupled multi-processor system is the IBM System/390 9000 series family of computers. The basic organization of a tightly coupled multi-processor (MP) system comprises a plurality of processors which may be selectively connected to a plurality of independently addressable memory modules known as basic storage modules (BSMs). In a typical MP system, there may be N processors and M BSMs, where M is typically greater than N. Since all processors require equal access to the BSMs, there is some form of N×M switch, such as a cross-bar switch, which selectively connects a processor to an addressed BSM for storing and retrieval of data.

The parameters of importance to the performance of the MP system are processor cycle time, bandwidth, electrical path length, round trip delay, and timing skew. The processor cycle time is minimized by placing the cycle determining path elements in the closest possible proximity to each other. The bandwidth between a processor and a BSM is maximized by using the fastest possible data rate over a large number of parallel connections between the processor and the switch and between the switch and the BSMs. The electrical path length is the length between data latching points on different, but interconnected, functional units as measured in nanoseconds. The total round trip delay from a processor to an addressed BSM and back is known as the memory latency. This includes a number of electrical path lengths. The skew is the electrical path length differences due to variations in routing from one point to another. The area of memory is determined by the surface area required to contain the storage chips and the logic support chips.

In a known construction, referred to as "card-on-board" (COB) memory, all of the external interconnections are placed on one edge of the card. When the memory is accessed for data, a signal must travel from the input edge of the card to the far side and return back to the original edge. In so doing, it has traversed the width of the card twice, with attendant delay, and the required data appears at the same edge from which it was requested and therefore, no closer to its final destination. It is evident in this conventional system, there is significant skew or difference in electrical path due to accessing different parts of the memory or different memory chips in different sections of the memory, or from different processors.

SUMMARY OF THE INVENTION

It is therefore an object of the present invention to provide a new machine design which minimizes latency between many high performance processors and a large amount of shared memory.

It is another object of the invention to provide a very high sustained performance capability for a computing system within acceptable demands placed on the technology required to package it.

According to the invention, wire length, latency and skew are minimized while supporting a very fast cycle time and high bandwidth by stacking edge connected modules (ECMs), which are the basic building block of the new machine design. The ECMs are characterized by signal input/output (I/O) pads on three edges, the two opposing edges being referred to as the inside connector edges and the third edge being referred to as the global connector edge. Within a subsystem, the data flow from a processor to addressed memory and back to the processor is unidirectional about a loop defined by connections on the inside edges of the modules. The same unidirectional data flow is maintained between subsystems via global connections made to the global connector edge.

The ECMs support one or more processors per module, a plurality of BSMs per module, and portions of request and respond switches per module. In a preferred embodiment, there are two processors per module and four BSMs per module. Groups of processor modules, switch modules and BSM modules are stacked in such a manner that skew is minimized. This can be a single, stand alone stack but, according to one aspect of the invention, a group of processor modules and a group of request switch modules are stacked in a first stack, and a group of BSM modules and a group of respond switch modules are stacked in a second stack. The two stacks are arranged adjacent one another with the request switch module group above or below the processor module group and the respond switch module group below or above the BSM module group so that the respond switch module group is horizontally adjacent the processor module group and the request module group is horizontally adjacent the BSM module group.

The stacks as described form a subsystem which may be used as a stand-alone system or, as mentioned above, interconnected with other subsystems via the global connectors connected to the third edges of the ECMs. For example, two pairs of stacks as described above which are the mirror images of one another such that the group of BSM modules of one pair are immediately adjacent the group of BSM modules of the other group may be interconnected via global wiring in a manner that minimizes latency and skew within this larger subsystem. Thus, the global connectors allow the processors of one subsystem to be connected to the BSMs of another subsystem to produce a massively parallel computer system. In one implementation of the invention, a total of eight stacks comprised of two sides of four stacks each form a computer system of 128 processors and 256 BSMs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
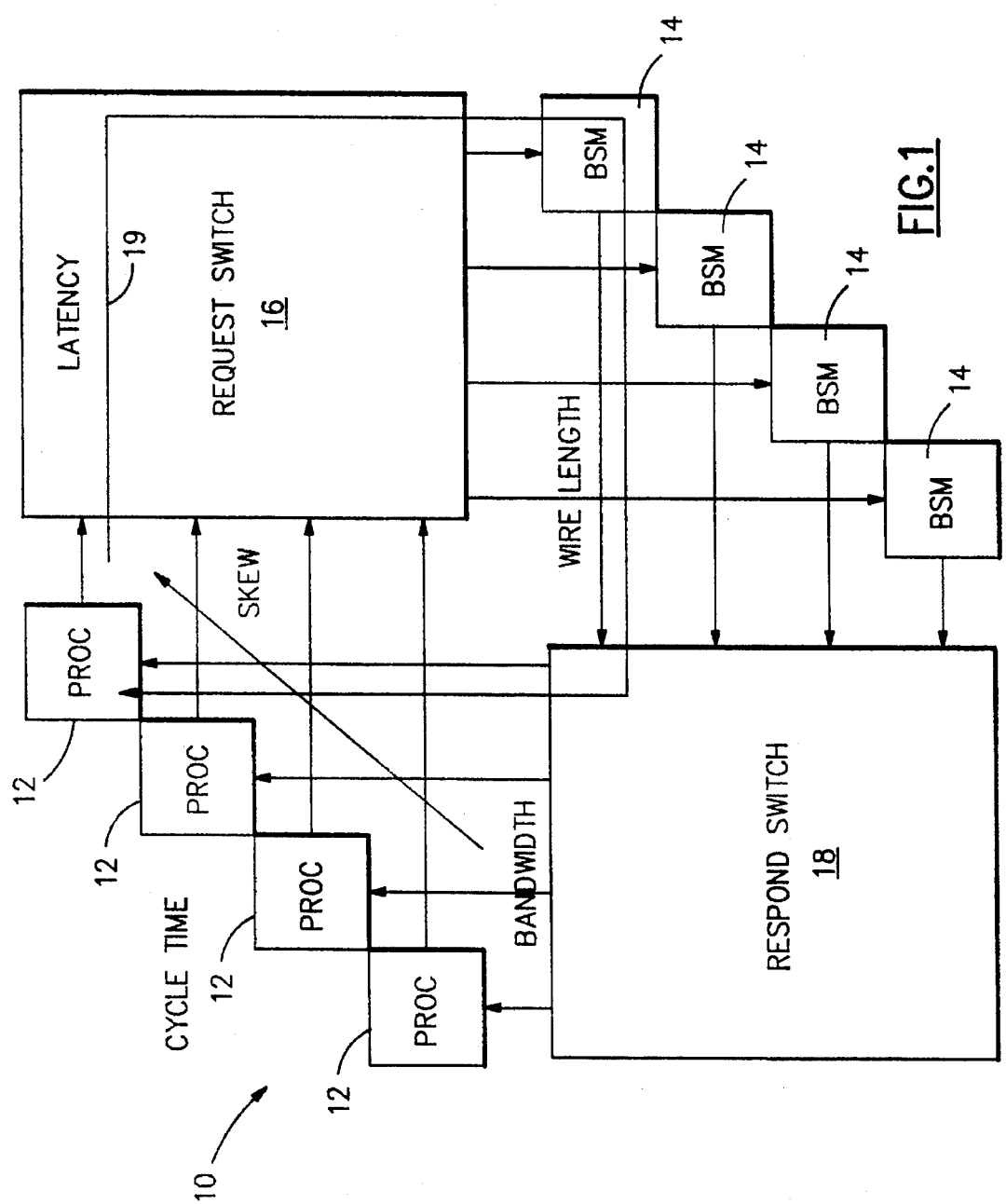
FIG. 1 is a generalized block diagram of a high performance computer system.

Referring now to the drawings, and more particularly to FIG. 1, there is shown a block diagram of a high performance computer system 10 of the type in which the subject invention is implemented. The system comprises a plurality of processors 12 and a plurality of basic memory modules (BSMs) 14 interconnected by a request switch 16 and a respond switch 18. The switches 16 and 18 may be, for example, cross-bar switches of the type described in U.S. Pat. No. 4,630,045 to Christos J. Georgiou.

This type of computer system is referred to as a tightly coupled parallel multi-processor system and may be used fop either commercial or scientific applications. Any number of the processors 12 have equal access to the plurality of BSMs 14 comprising the main memory of the system. The number of BSMs is related to the number and organization of the processors in such a way as to reduce the probability of contention between processor elements for the same area of memory to an acceptable level.

Since each processor 12 requires access to each BSM 14, the switches 16 and 18 between the processors and the BSMs are required to avoid excessive interconnections and complexity. The request switch 16 establishes a path to the BSMs 14 to request information and to store data from the processors 12, and the respond switch 18 establishes a path from the BSMs 14 to fetch requested data to the processors 12. These switches are often contained within the same physical package. However, in the preferred embodiment of the invention, they are advantageously packaged separately from each other.

The critical determinants of a computer systems performance ape (1) processor cycle time and functionality, (2) the bandwidth between processors and main memory required to retrieve and store data at a rate consistent with the computations, and (3) the latency or delay from the time data is requested from the memory by a processor to the time it is received by the processor. Each of these performance determinants is discussed below.

Processor Cycle Time

For a given processor organization and instruction set, whether scalar or vector, the peak performance is partly determined by the cycle time. The power of the processor is generally related to the number of circuits and local storage elements it contains, but the cycle time is dictated by the circuit and package delays in the cycle determining path. To minimize the packaging delay contribution to the cycle time, all the circuits in the cycle determining path should be placed on the same basic packaging element, in this case a module or card. This invention employs such a package, described herein as an edge-connected module (ECM). Details of the construction of the ECM may be had with reference to cross-referenced U.S. Pat. No. 5,168,347.

Bandwidth

Each processor comprises at least a scalar engine and, optionally, one or more vector processing pipes. Within a vector cycle, a pipe will typically perform the following operations:

1. Load a first operand from memory.
2. Load a second operand from memory.
3. Perform a multiply operation.
4. Perform an add operation.

5. Store the result back in memory.

Hence, to perform two floating point operations (FLOPs) as represented by operations 3 and 4 above, three storage operations are required. The typical width of the data being operated on is 64 bits, or a double word, so in one vector cycle for one pipe three 64-bit words must be transferred between memory and a requesting processor. This is accomplished through processor ports to memory and memory ports to the processor. If one double word can be transferred per cycle per port, then each pipe requires at least three ports to ensure that memory transfers can sustain the peak processing rate. A typical processor will contain one scalar engine and two vector pipes, so that, for a transfer rate of one double word per port per cycle, at least six ports are required pep processor. The scalar demands on data transfer are such that it can reasonably share the ports with the vector pipes without significant performance degradation.

The desired data bandwidth, then, is equal to:

(Data width/Cycle time)×Ports/pipe× Pipes/processor×Processors/system

To this must be added the overheads for routing and control information.

Latency

Memory latency, as indicated by the arrow 19 in FIG. 1, is influenced by a number of factors. These include the following:

1. The storage capacity of the main memory. This affects the "hit" ratio and determines how frequently the data requested is not available from main memory and must be fetched, with a latency penalty, from the next level of storage. Large memory capacity imposes a problem on the package in order to contain the memory hardware in a small enough space. If the space becomes too large, packaging delays become unacceptable.
2. The number of independently addressable memory units. The larger this number, the lower is the probability that any two requests from processors are for data in the same commonly addressed unit, hence the fewer times that a processor must wait due to contention for the same memory area. Increasing the number of independently addressable units (i.e., BSMs) adds to the number of interconnections to be made between memory and the switches.
3. The active circuit delays in the round trip path (not significantly affected by package design).
4. The package-related delays (time-of-flight), determined primarily by the lengths of wiring.
5. Timing tolerances within the system, in particular skews in the clock distribution and data arrival times.

Edge-Connected Module

Figure 2A:
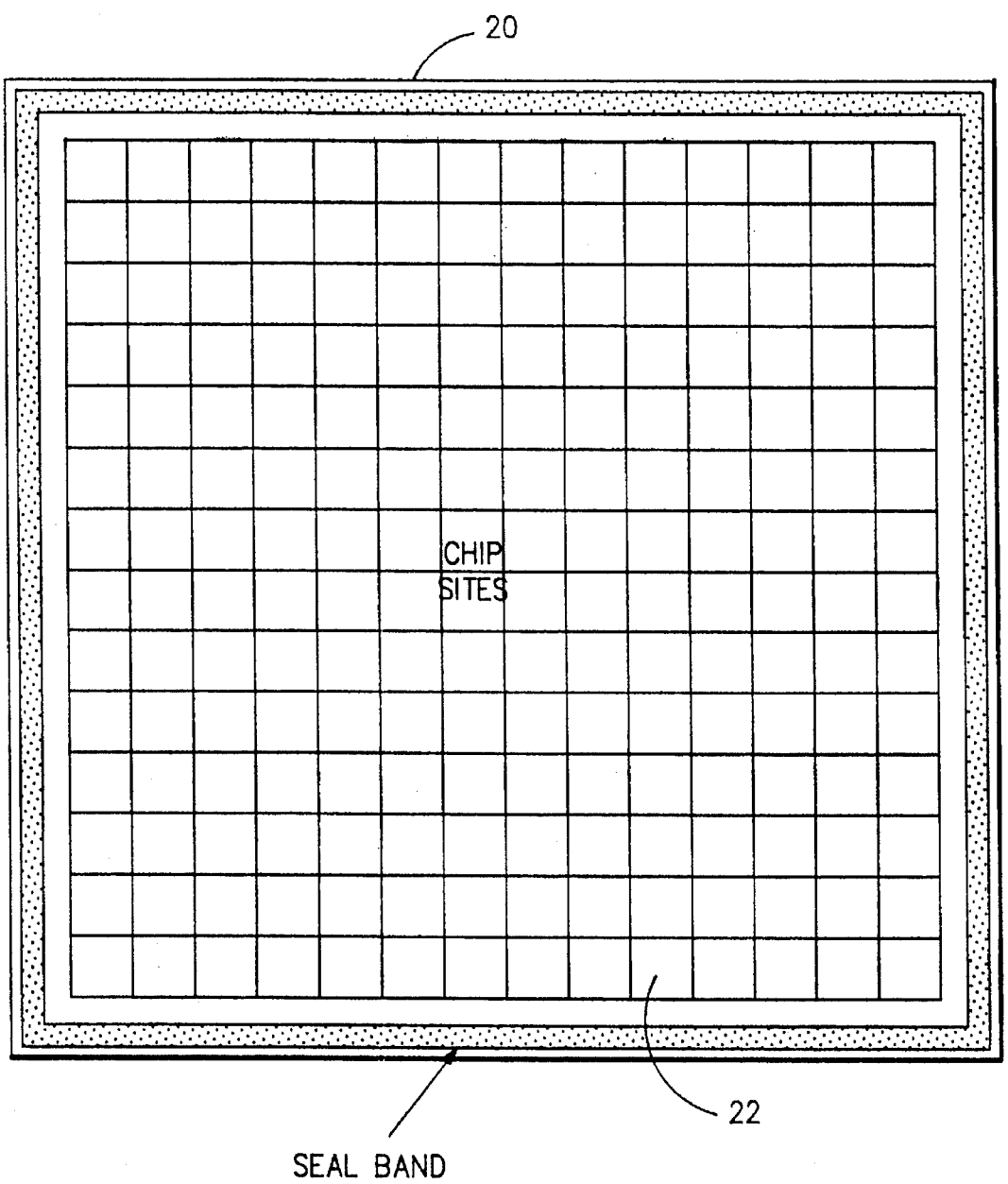
FIG. 2a is a view of the top surface of an edge-connected module.
Figure 2B:
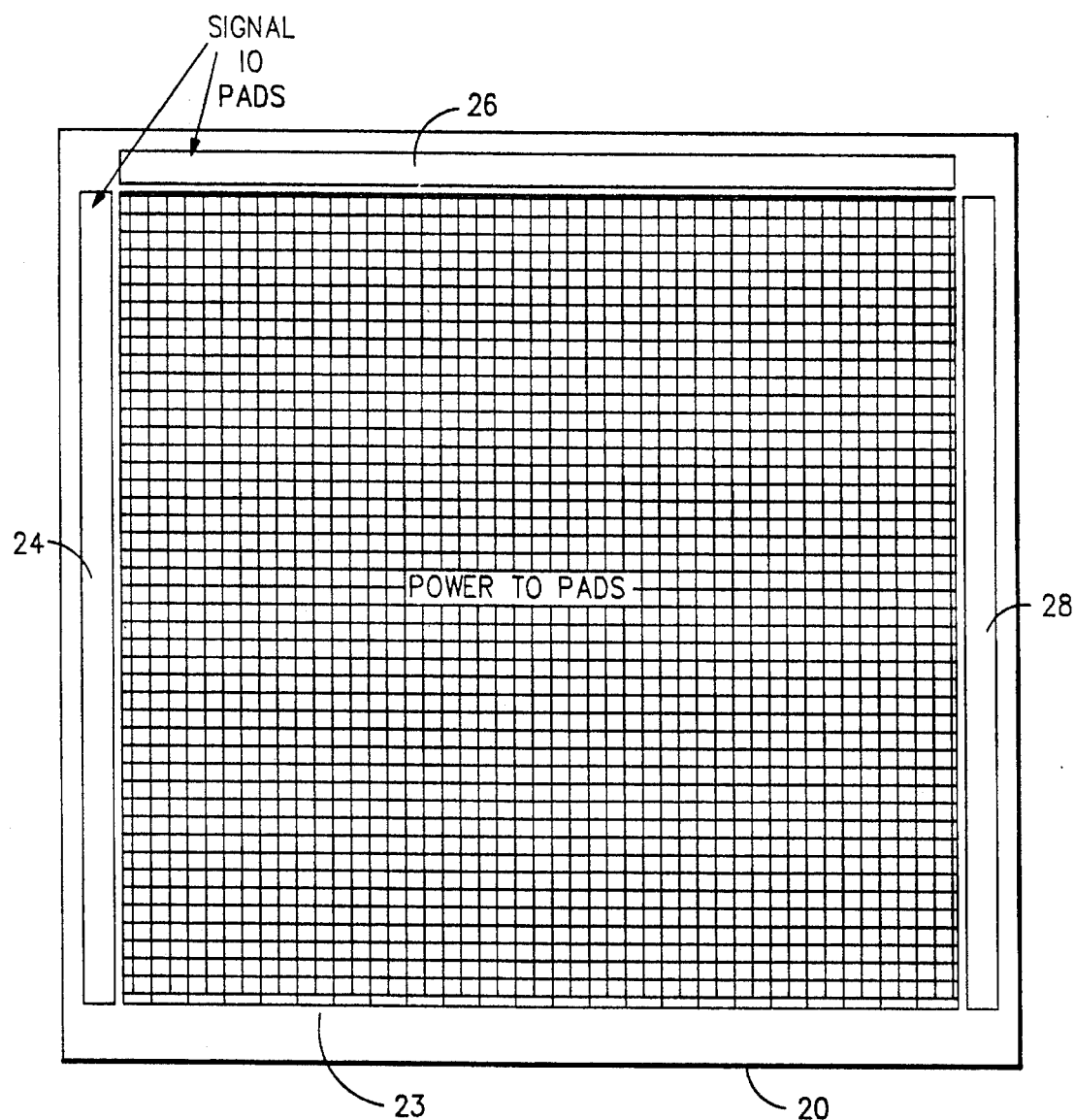
FIG. 2b is a view of the bottom surface of the edge-connected module.
Figure 2C:
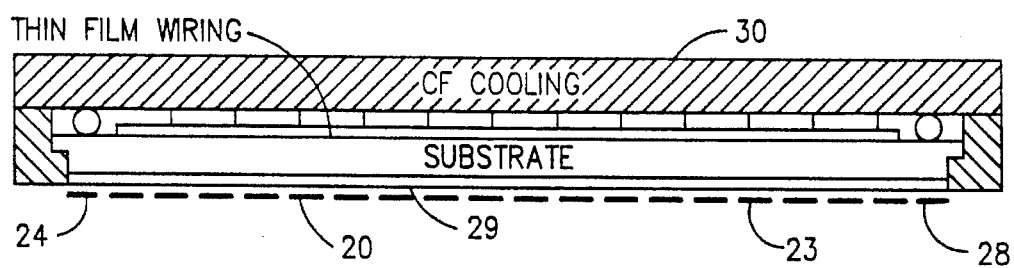
FIG. 2c is a cross-sectional view of the edge-connected module which is the basic building block of the invention.

The basic building block of the invention is the edge connected module (ECM) 20, the top surface of which is illustrated in FIG. 2a. A more detailed disclosure of the ECM is to found in cross-referenced U.S. Pat. No. 5,168,347. In the example illustrated, 196 chip sites 22 are shown where logic and/or array chips may be mounted. The bottom surface of the ECM 20 is shown in FIG. 2b, where the area underneath the chip sites is dedicated to power pads 23 which make connections to the power supply for the ECM. Three of the four perimeter edges on the bottom surface carry a dense array of signal input/output (I/O) pads 24, 26 and 28. I/O pads 24 and 28 on opposing edges of the ECM facilitate connections within a subsystem, while I/O pads 26 facilitate global connections, as described in more detail hereinafter. FIG. 2c illustrates the preferred cross-section of the ECM 20. The chips-to-substrate interface is such that mismatches in thermal expansion coefficients do not cause undesirable stress on the bond, either by the cushioning effect (compliance) of the thin film wiring used on the top surface to escape from the chip I/Os and to provide local interconnections or by matching the thermal coefficient of expansion of the substrate to that of the chip. Glass ceramic, copper/invar/copper or printed circuit boards would be suitable substrate materials.

For long wires on the module, where propagation velocity and low electrical resistance are desired, one or more layers of fatter wiring 29 are on the bottom surface, where they can interconnect the chip signal I/Os with the I/O pads 24, 26 and 28 around the perimeter of the module. Vias connect gold-plated power pads on the bottom surface of the substrate to the chip power I/Os, and others permit signal connections to pass from the top to the bottom surface. Although the signal connections are shown only on the bottom surface, both surfaces may be used if a connector such as that disclosed in U.S. Pat. No. 4,636,019 to John B. Gillett et al. is used. FIG. 2c shows a cooling manifold 30 which is in contact with the chips mounted on the ECM 20. Cooling of the chips may be accomplished by any of a number of ways known in the art. The preferred form of cooling is a liquid coolant circulating in a cooling jacket in thermal contact with the integrated circuit chips on the ECM, but other forms of cooling, including air convection or radiation, may be used depending on the thermal requirements of the computer system.

Memory Module

Figures 3A, 3B:
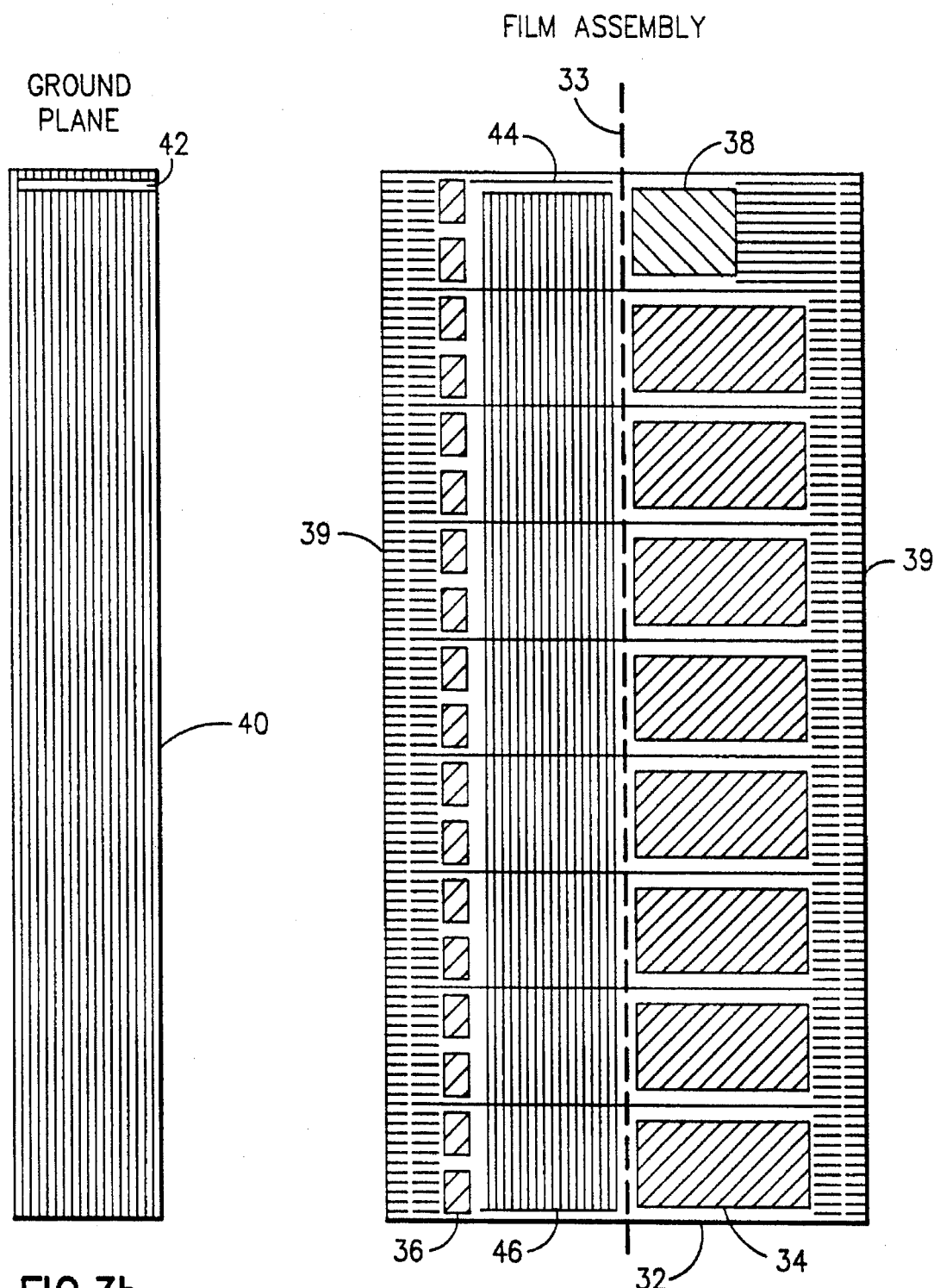
FIG. 3a is a plan view of a film assembly on which memory chips, their decoupling capacitors and a terminating resistor chip are mounted.
FIG. 3b is a plan view of a film carrying a ground plane.

The memory edge-connected module is required to contain many more chips than the processor ECM to maintain acceptable volumetric density. FIG. 3a shows a flexible film 32 with wiring on two surfaces on which are mounted memory array chips 34, their decoupling capacitors 36 and a terminating resistor chip 38. The film 32 is folded along the center of its long axis, as indicated by center line 33, and mounted to the substrate with outer lead bonds 39 along the two long edges. A film 40 carrying a ground plane is shown in FIG. 3b. The ground plane film 40 is connected at one end 42 to edge 44 of the film 32 and provides a return path for the long address and control wires 46 which originate and terminate at the end to which the ground plane is attached.

Figure 3C:
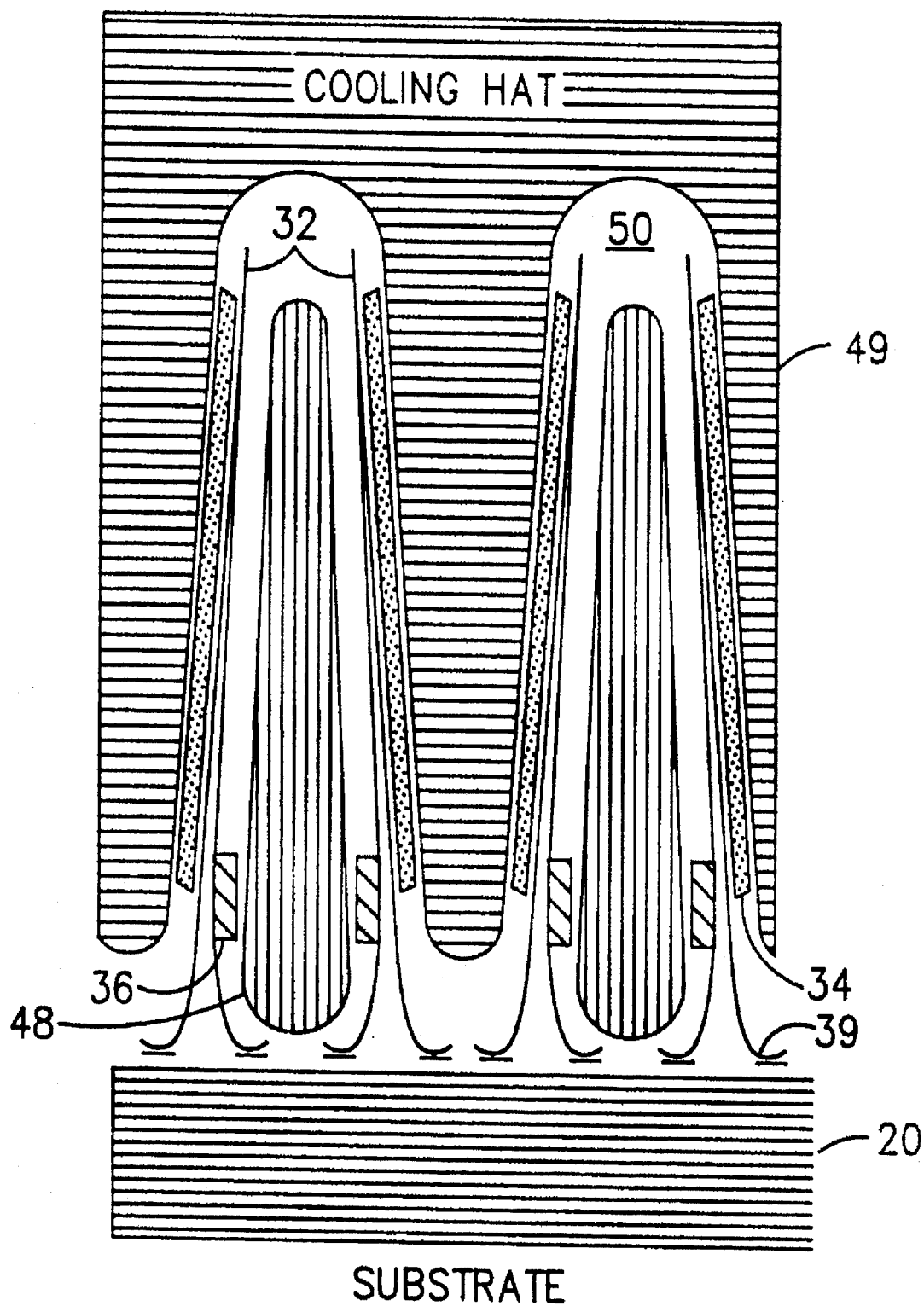
FIG. 3c is a cross-sectional view showing the assembly of a memory module incorporating the film assembly of FIG. 3a and the ground plane of FIG. 3b.

A compliant member 48 (e.g., a spring or strip of elastomer) is placed between two rows of back-to-back films 32, as shown in FIG. 3c. A cooling hat 49 having cavities 50 is placed over this assembly such that the memory array chips 34 on the films 32 are pressed against the inside surfaces of the cavities 50 receiving the back-to-back films to provide good thermal conductivity. A thin layer of thermally conductive oil further enhances this interface.

Figure 4A:
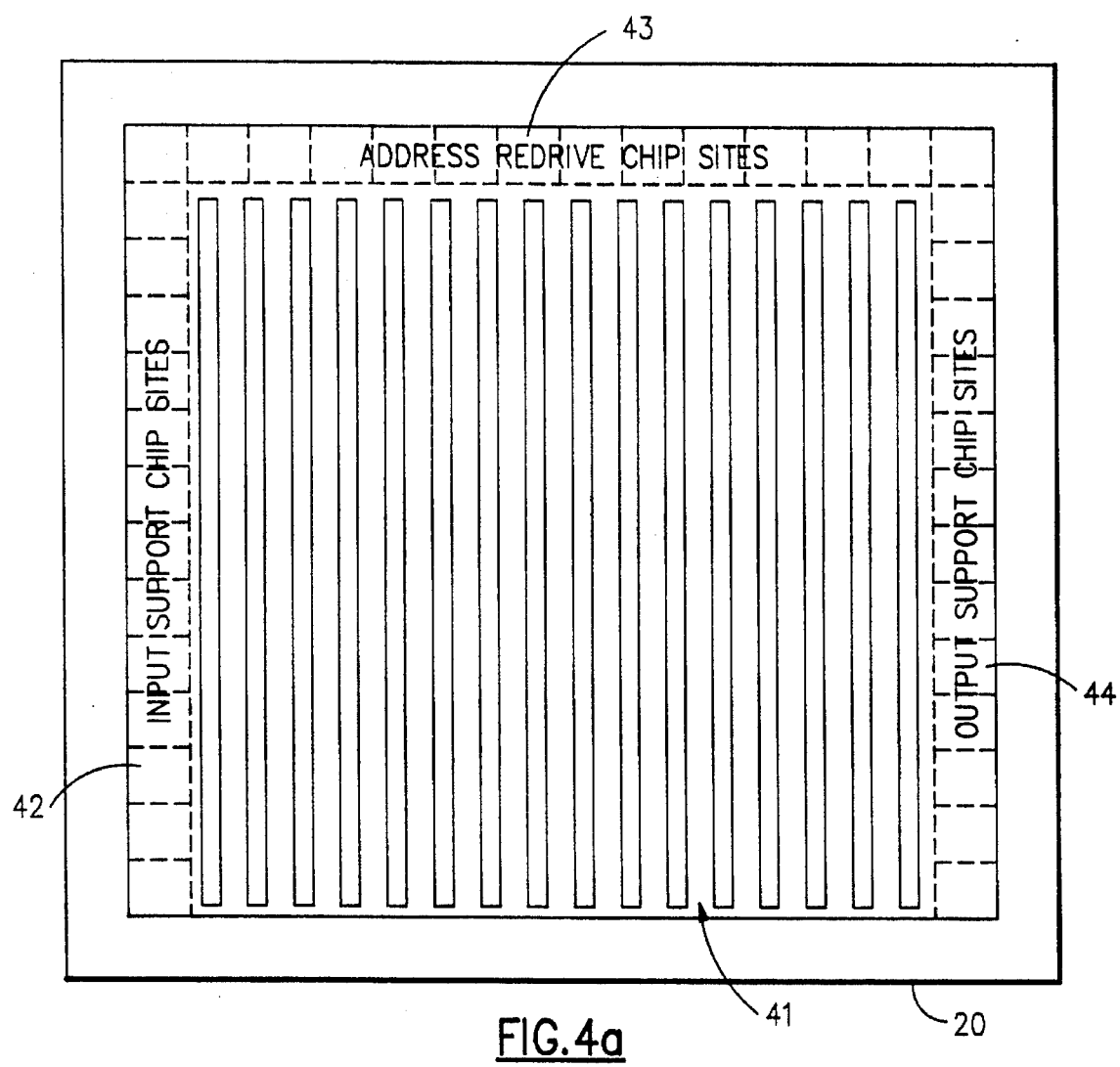
FIG. 4a is a top view showing a typical layout of a memory module.
Figure 4B:
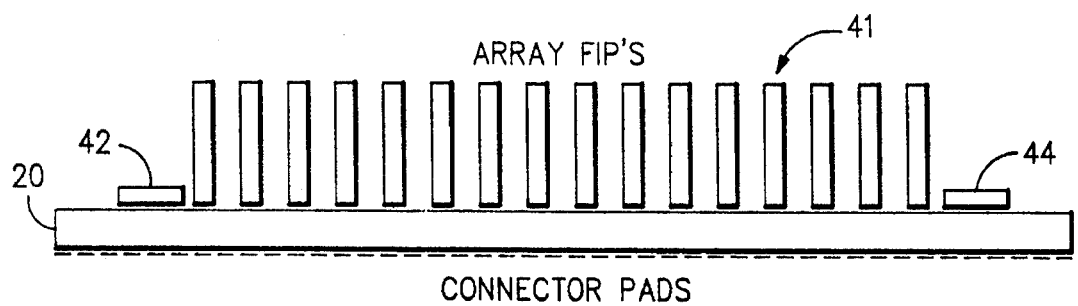
FIG. 4b is a side view of the memory module.

A typical layout of a memory ECM employing this construction is shown in FIG. 4a. The film strips illustrated in FIG. 3c fill the center of the top surface of a module 20 in an array 41, and logic support chips are located around the same three sides of the perimeter carrying the signal I/O pads on the lower surface of the module 20. The logic support chips include input support chips 42, address redrive chips 43 and output support chips 44. Note that the data input and the data output support chips are at opposite edges of the module, in such a way that address, input data and control signals enter at one edge and output data leaves from the opposite edge.

Field Replaceable Unit

Figure 5:
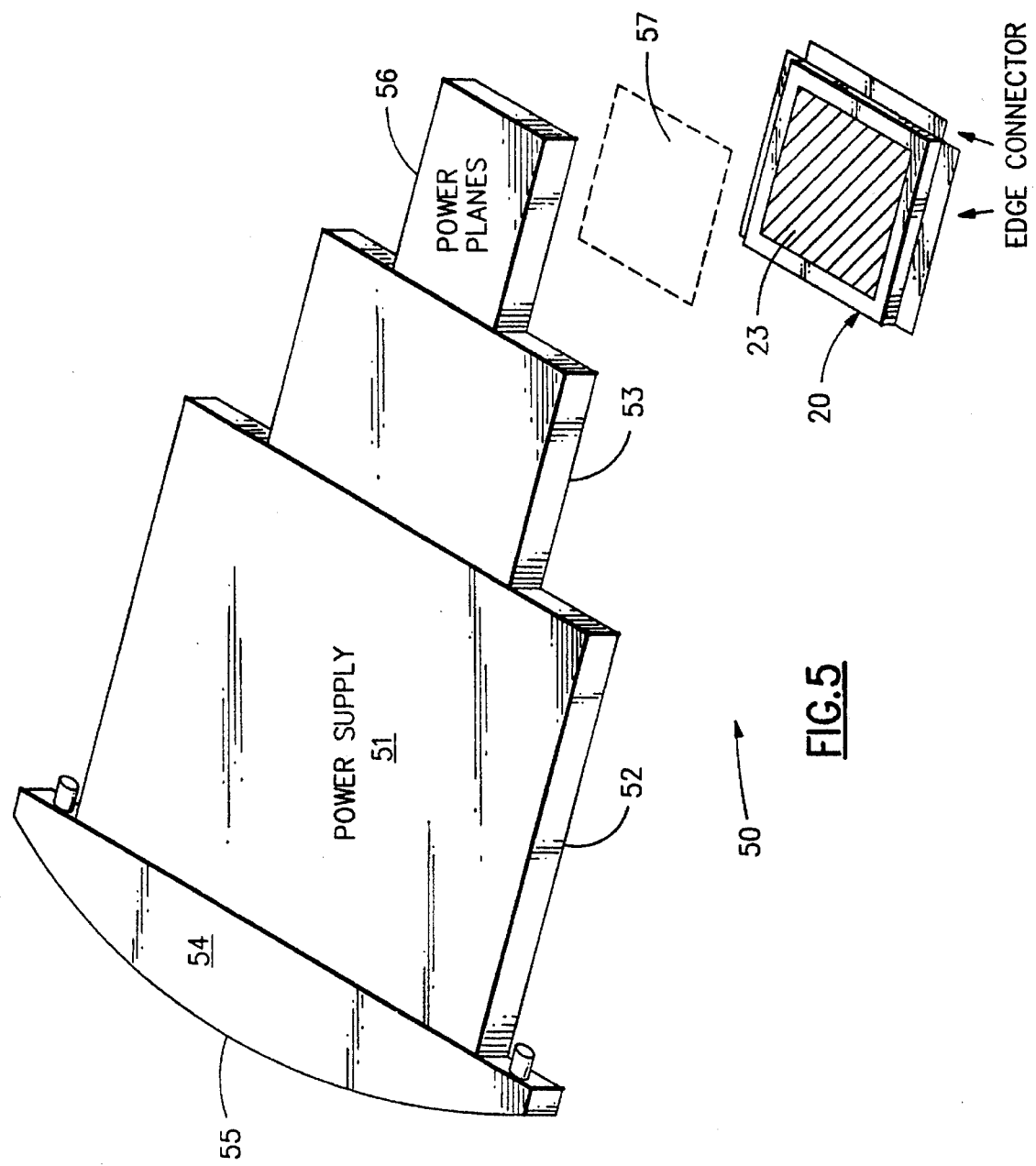
FIG. 5 is a generalized isometric view showing how the modules are connected to their dedicated power supplies.
Figure 6:
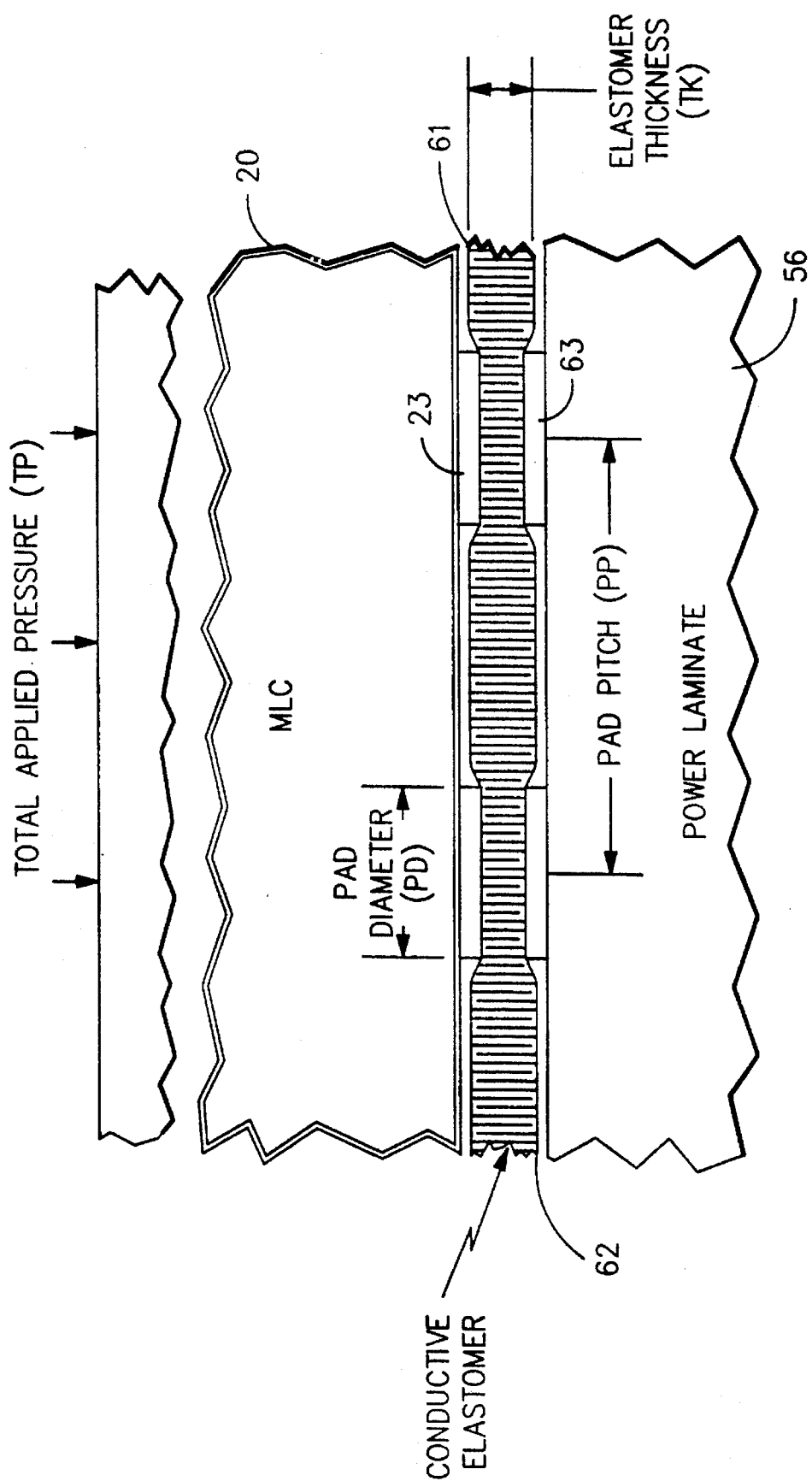
FIG. 6 is a cross-sectional view of an elastomeric pinless connector used to make the power connection between the power supply and a module.

Each ECM comprises a power boundary and so has its own dedicated power supply. The module 20 and its power supply 51 are assembled together to form a field replaceable unit (FRU) 50, as shown in FIG. 5. The power supply 51 comprises a primary section 52, a secondary section 53 and a water cooling manifold 54, the latter having a generally arcuate outer edge 55 conforming to the outer surface of the computer system. The interface between the module 20 and its power supply 50 is via power planes 56 and power connecter 57. The power planes 56 is an extension of the secondary section 53. Power pads (not shown) on the under surface of the power planes 56 correspond with power pads 23 on the mating surface of the module. Connection between the power plane 56 and the module 20 is accomplished by use of an interposer connector 57, such as Shin-Etsu's Polymer MAF, Fujipoly's W series, TRW's "Fuzz-Button" or similar connectors by AMP Inc., Rogers Corp., AT&T and others. An example of this type of connecter 57 is shown in FIG. 6. Basically, the connector comprises a flat sheet of elastomer 61 embedded with metal fibers 62 to maintain paths of conductivity through the thickness of the elastomer. There is, however, no conductivity along either of the other dimensions of the elastomer. Thus, when the power pads 63 of the power planes 56 are brought into registry with the power pads 23 of the module, a good electrical connection is made between the two sets of pads.

Module Stack

Figure 7:
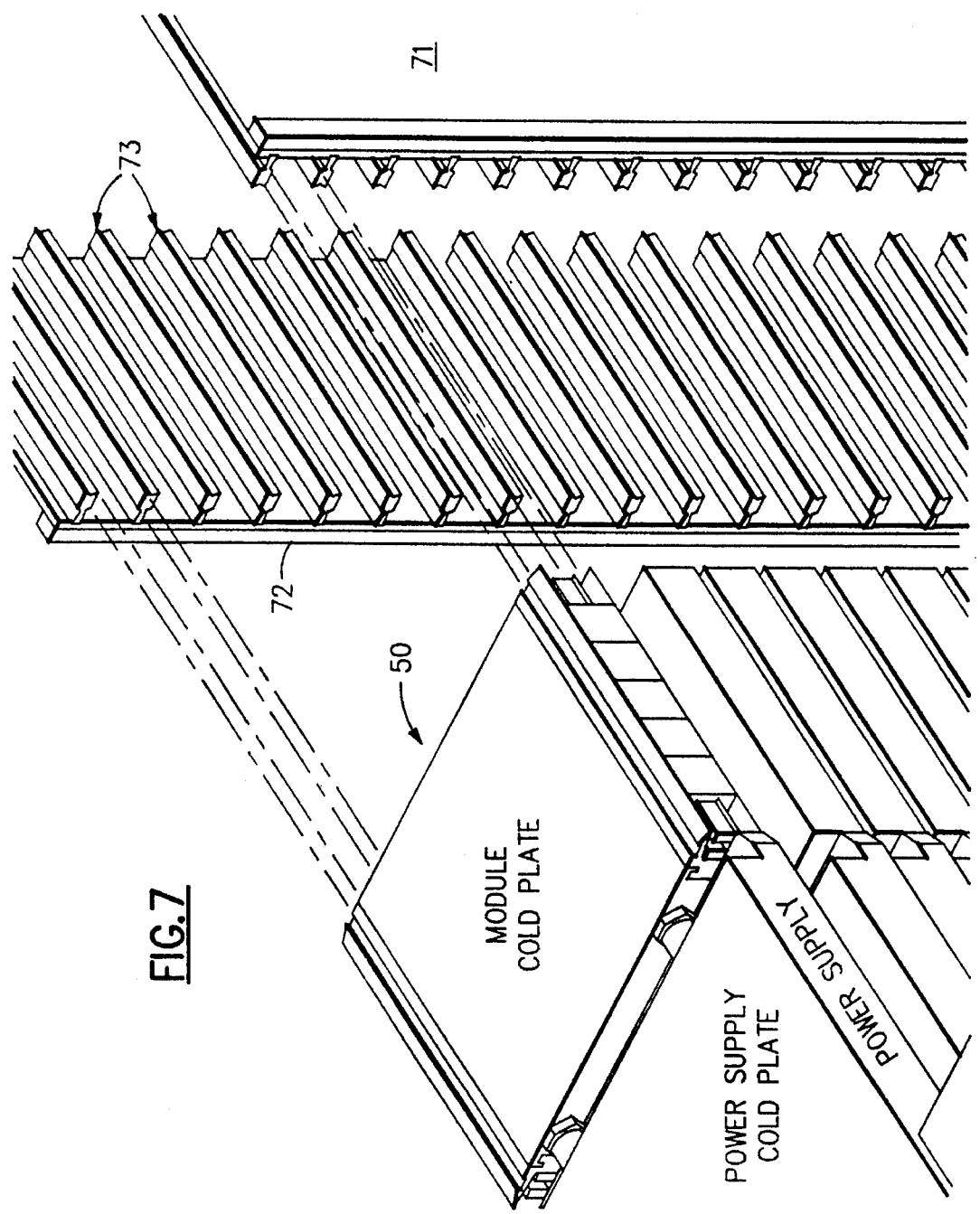
FIG. 7 is an isometric view showing how the edge connected modules are connected to signal boards in a stacked configuration.

For the next level of packaging, the FRUs of FIG. 5 are stacked like trays above each other. Their signal interconnections are made with zero insertion force (ZIF) connectors. A suitable connector of this type is described in U.S. Pat. No. 4,636,019 to Gillett et al. FIG. 7 shows how a FRU 50 is inserted between two wiring boards 71 and 72 along connector guides 75 such that, when seated, the ZIF connectors make the electrical connection between the module and the boards. The third (front) board and its associated connector are omitted in this illustration to show an embodiment for an application where the front board is not required.

Figure 8:
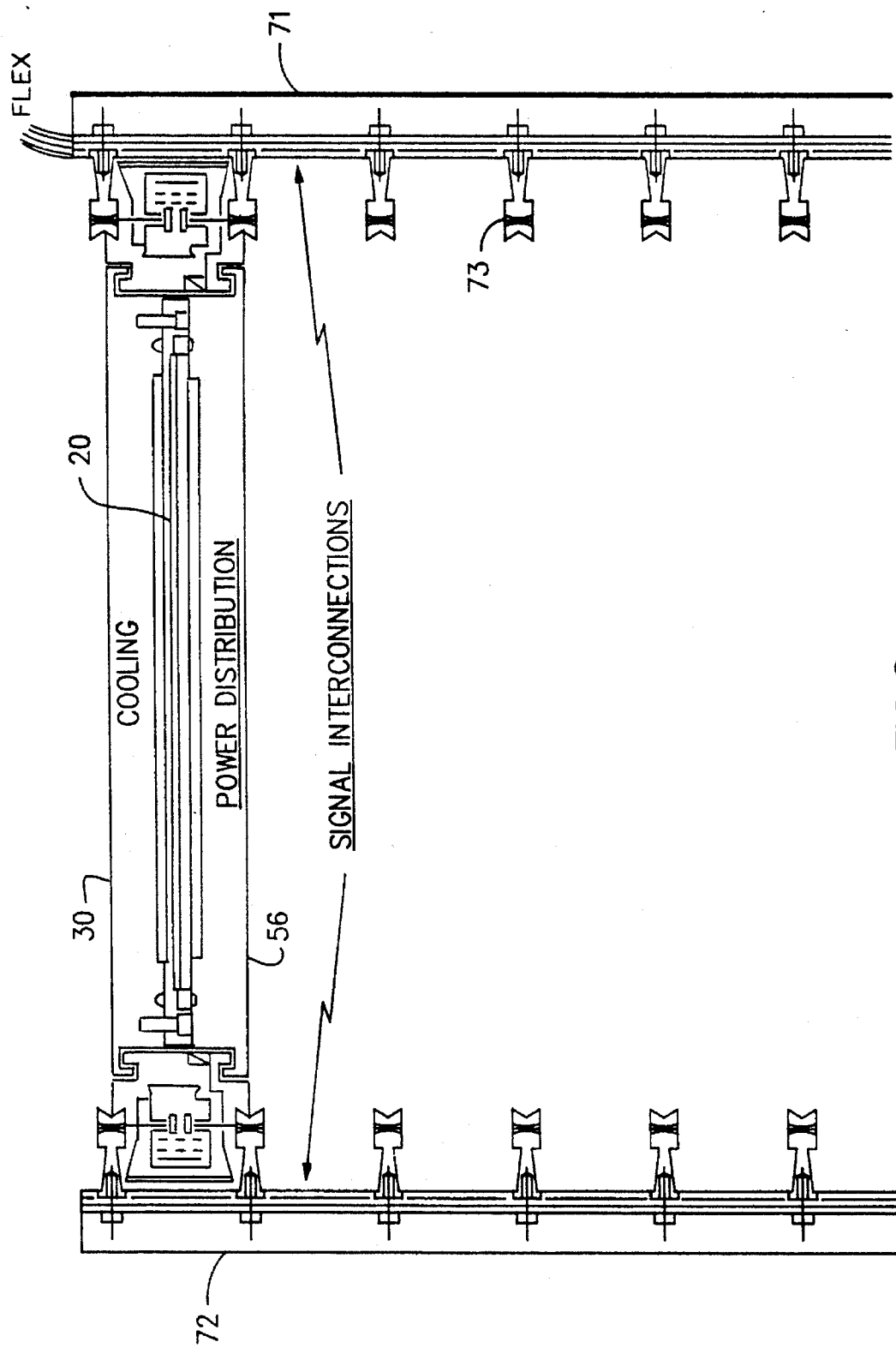
FIG. 8 is a cross-sectional view showing in more detail the connection of the edge connected modules to the signal boards.

The cross-sectional view of FIG. 8 shows the separation of power distribution and signal interconnections, freeing the vertical signal interconnecting boards to be dedicated to signal wiring without the need to incorporate heavy power distribution planes.

Figure 9:
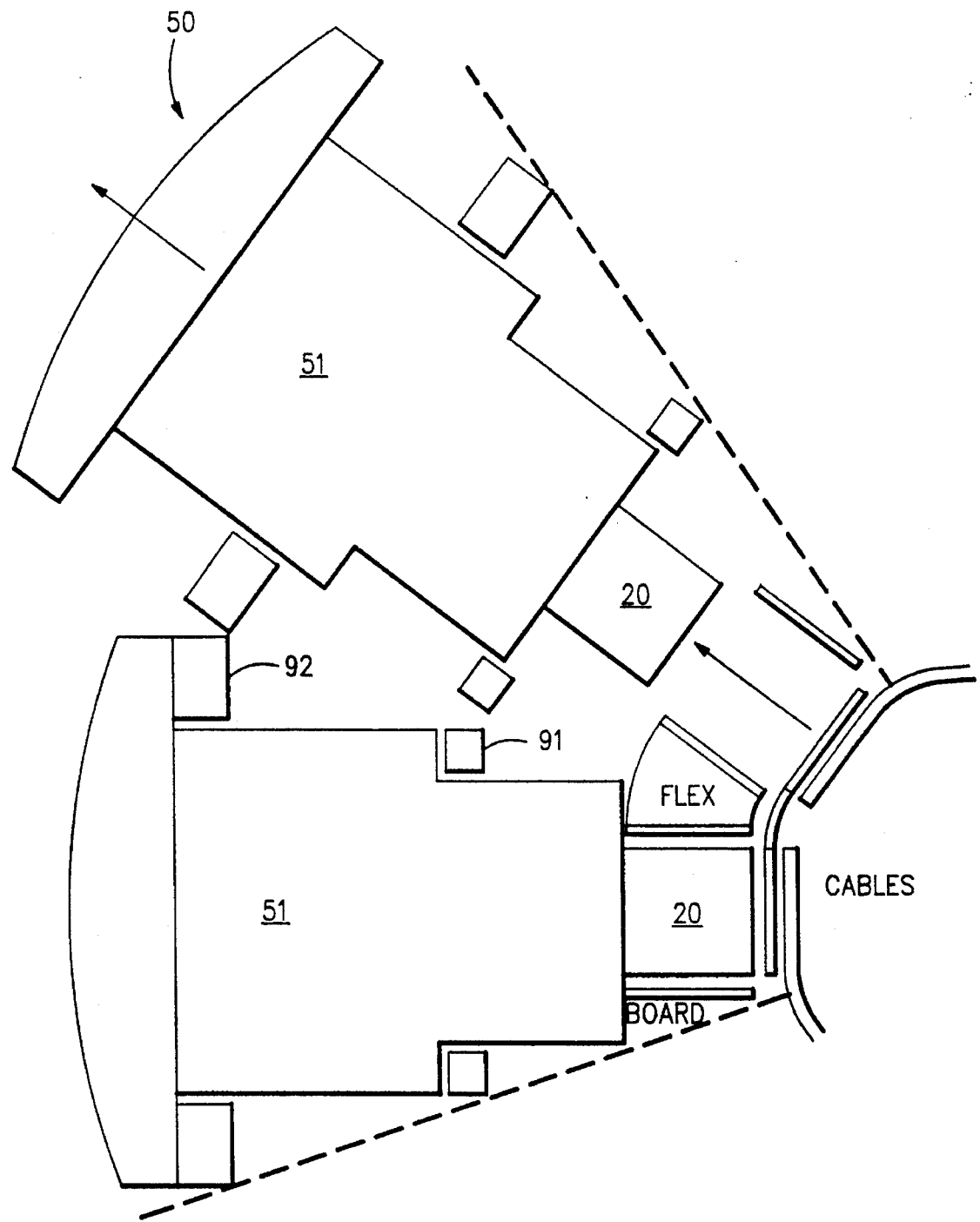
FIG. 9 is a plan view showing the removal of a field replaceable unit from the frame.

FIG. 9 is a plan view of the stack showing the direction of insertion and removal of the FRU 50. High voltage direct current is carried by the common power bus 91, and cooling manifolds 92 carry the water for power supply and ECM cooling. Connections are made to the power buses 91 and the cooling manifolds 92 as the FRU 50 is inserted into the frame.

Figure 10:
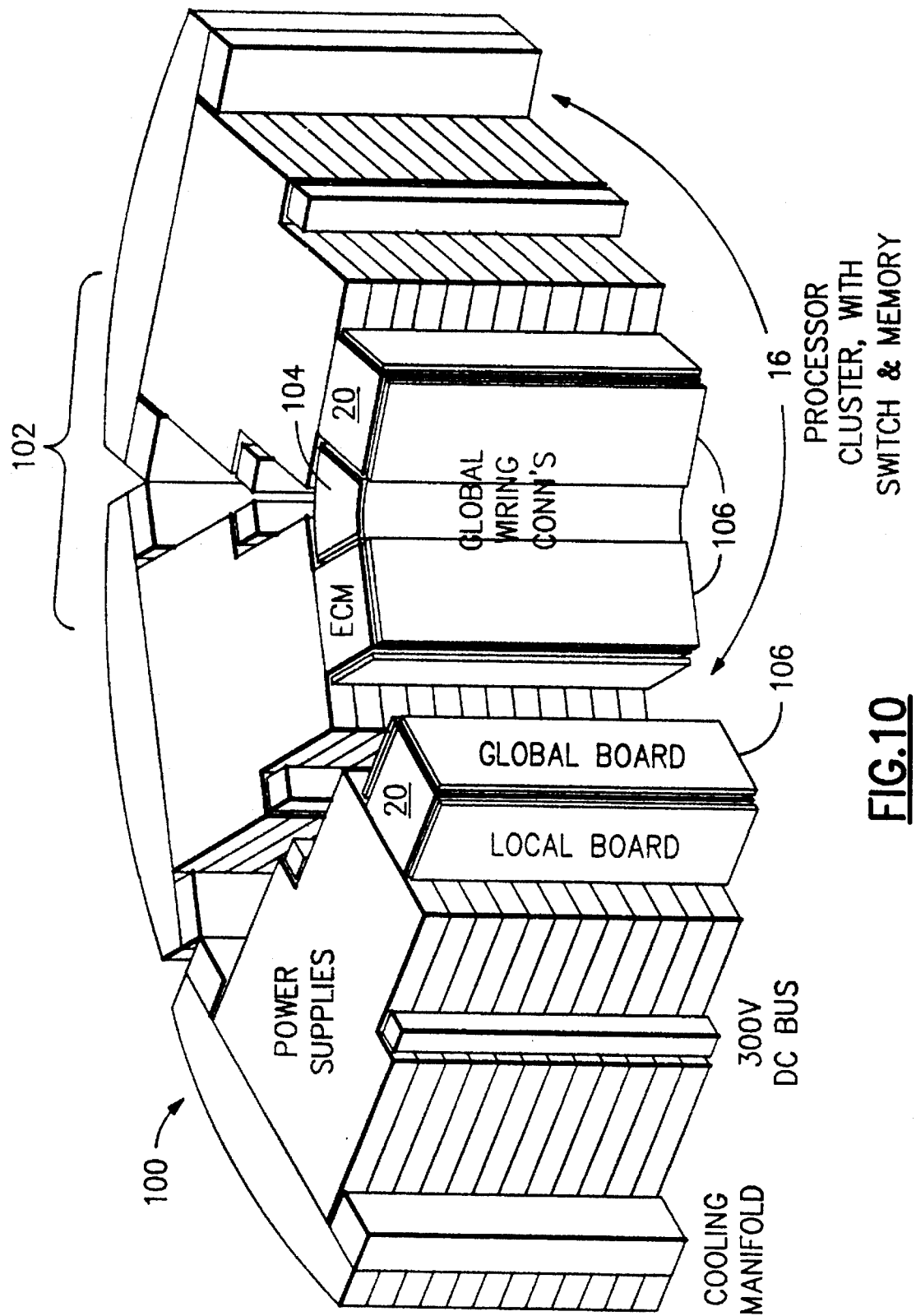
FIG. 10 is an isometric view showing how stacks may be combined to form a joined pair.

Each stack may operate as a stand-alone unit 100 or may be combined with another stack to form a joined pair 102, as shown in FIG. 10. The connections between adjacent stacks are made by flexible wiring 104, while the global wiring connections 106 are connected to individual ECMs 20 along their third edges carrying the I/O pads 26 shown in FIG. 2b. The joined pair 102 forms a important part of this invention.

System Organization

Figure 11:
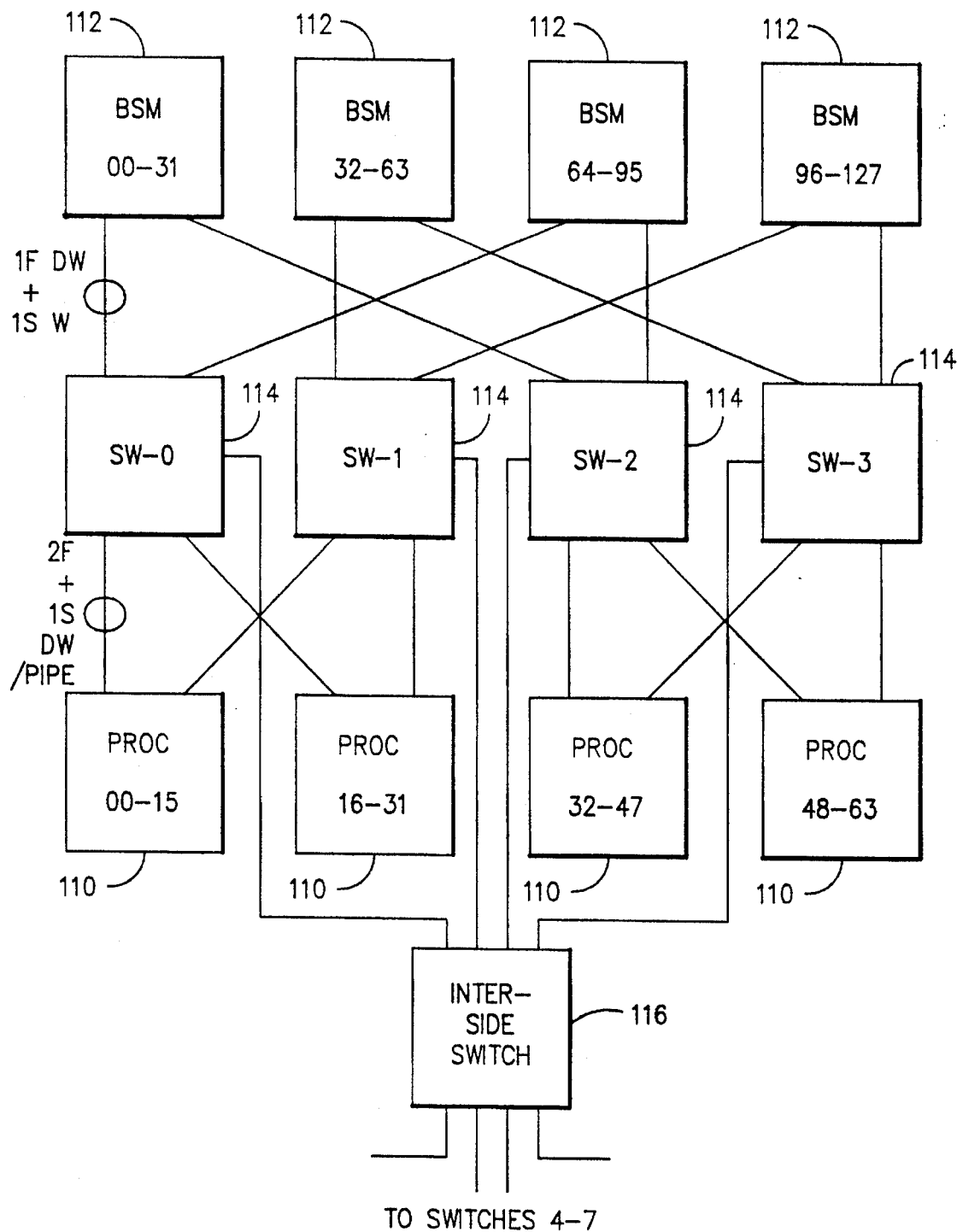
FIG. 11 is a block diagram showing the packaging concept according to the invention for the example of 128 processors with 128 GBytes of memory.

To illustrate the packaging concept of the subject invention, reference is now made to FIG. 11. In this example, 64 processors 110, numbered 00 to 63 in four groups, and 128 BSMs 112, numbered 00 to 127 in four groups, are split into four clusters, each cluster containing 16 processors, 52 BSMs and the associated request and respond switches 114, numbered 0 to 3. Each processor is assumed to comprise a scalar engine and two vector pipes, although from a packaging interconnection viewpoint, only the number of pipes on an ECM is important. In a specific example, two processors are mounted on an ECM, for a total of two scalars, four vector pipes and twelve logical ports per ECM.

From FIG. 11, it will be seen that there are twenty-four physical ports per ECM, since each logical port is duplicated to match the switch configuration. For example, a vector pipe in processor number 00 has two double word fetch ports and one double word store port to switch 0, with a duplicate set of ports connected to switch 1. Similarly, each BSM has one fetch and one store double word port to its local switch, with duplicates to a remote switch. The cross coupling is such that each processor has access to each BSM.

The schematic diagram of FIG. 11 illustrates one side of a computer system in a specific implementation of the invention. The other side, also having 64 processors and 128 BSMs with their corresponding request and respond switches, is the mirror image of side illustrated. Data transfer between the two sides is accomplished through the inter-side switch 116. The resulting computer system comprises 128 processors and 256 BSMs in a massively parallel system.

Packaging Structure

Figure 12:
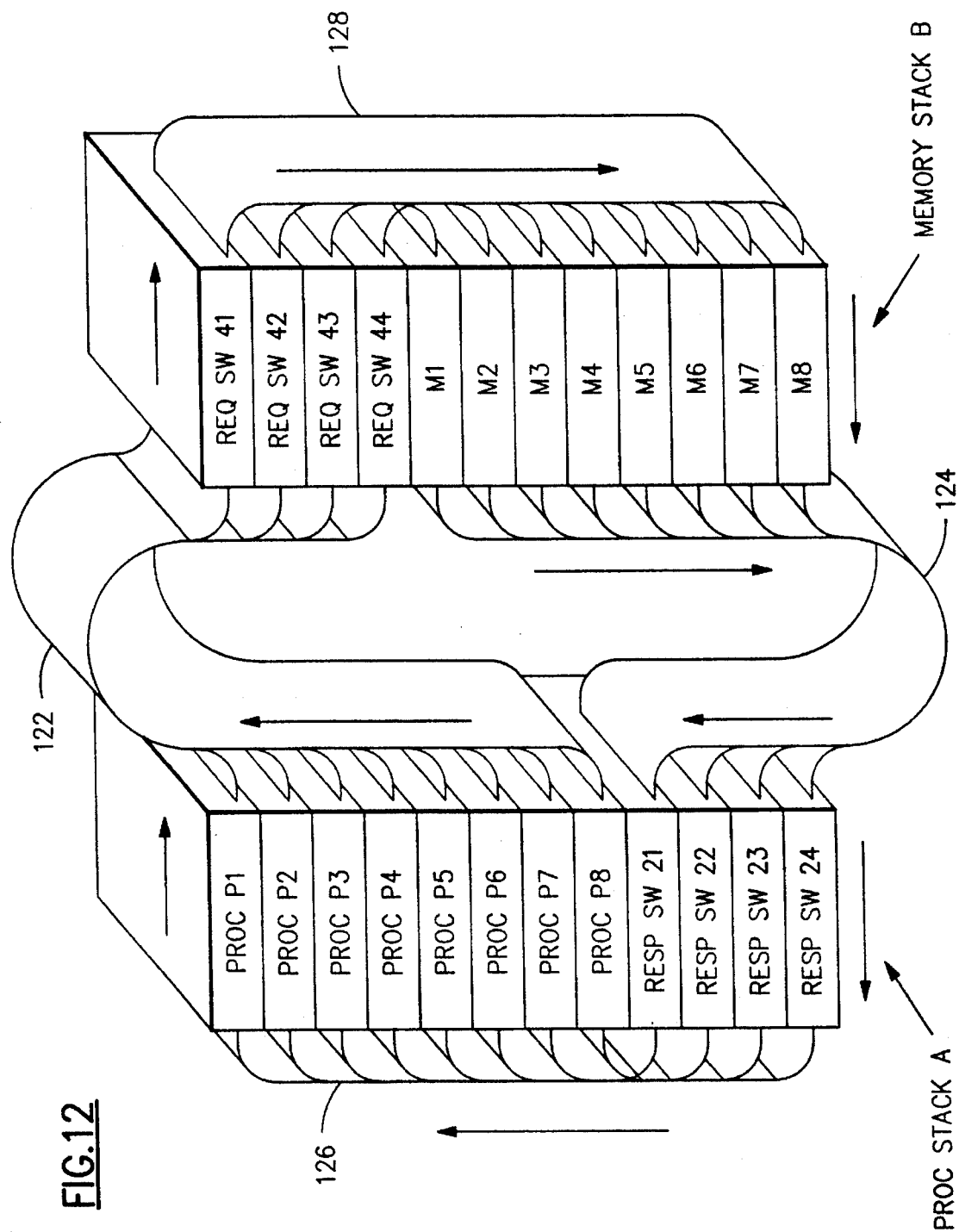
FIG. 12 is a block diagram showing a sixteen processor cluster.

A cluster of sixteen processors and thirty-two BSMs, with their associated request and respond switches, is packaged in two adjacent stacks A and B, as shown in FIG. 12. This arrangement is described in more detail in cross-referenced U.S. Pat. No. 5,058,053, to which reference may be made. In this arrangement, there are eight processor ECMs, P1 to P8, and four respond switch ECMs, SW 21 to SW 24, in stack A, eight BSM ECMs, M1 to M8, and four request switch ECMs, SW 41 to SW44, in stack B. Note that the request switch ECMs and the respond switch ECMs can be interchanged between stacks A and B. The interconnections between stacks A and B are by means of flexible, planar cables 122 and 124. The interconnections 126 between the processor ECMs and respond switch ECMs in stack A and the interconnections 128 between the BSM ECMs and request switch ECMs in stack B may be by means of flexible cable or rigid circuit boards.

In FIG. 12, the arrows indicate the direction of data flow around the cluster. As previously mentioned, the natural flow of information through the memory modules M1 to M8 is uni-directional. This is illustrated in FIG. 12 by data entering at the right of the ECMs M1 to M8 and leaving at the left, Similar uni-directional flow occurs in the request and respond switch modules and in the processor modules.

With the arrangement shown, the length of the round trip path from any processor P1 to P8 through any BSM M1 to M8 and back to the same processor always the same. Hence it is possible to originate a clock signal in a clock module and have it follow substantially the same path as the data such that ripples around the data path in synchronism with the data, thus minimizing skew. This is illustrated conceptually in FIG. 13.

Figure 13:
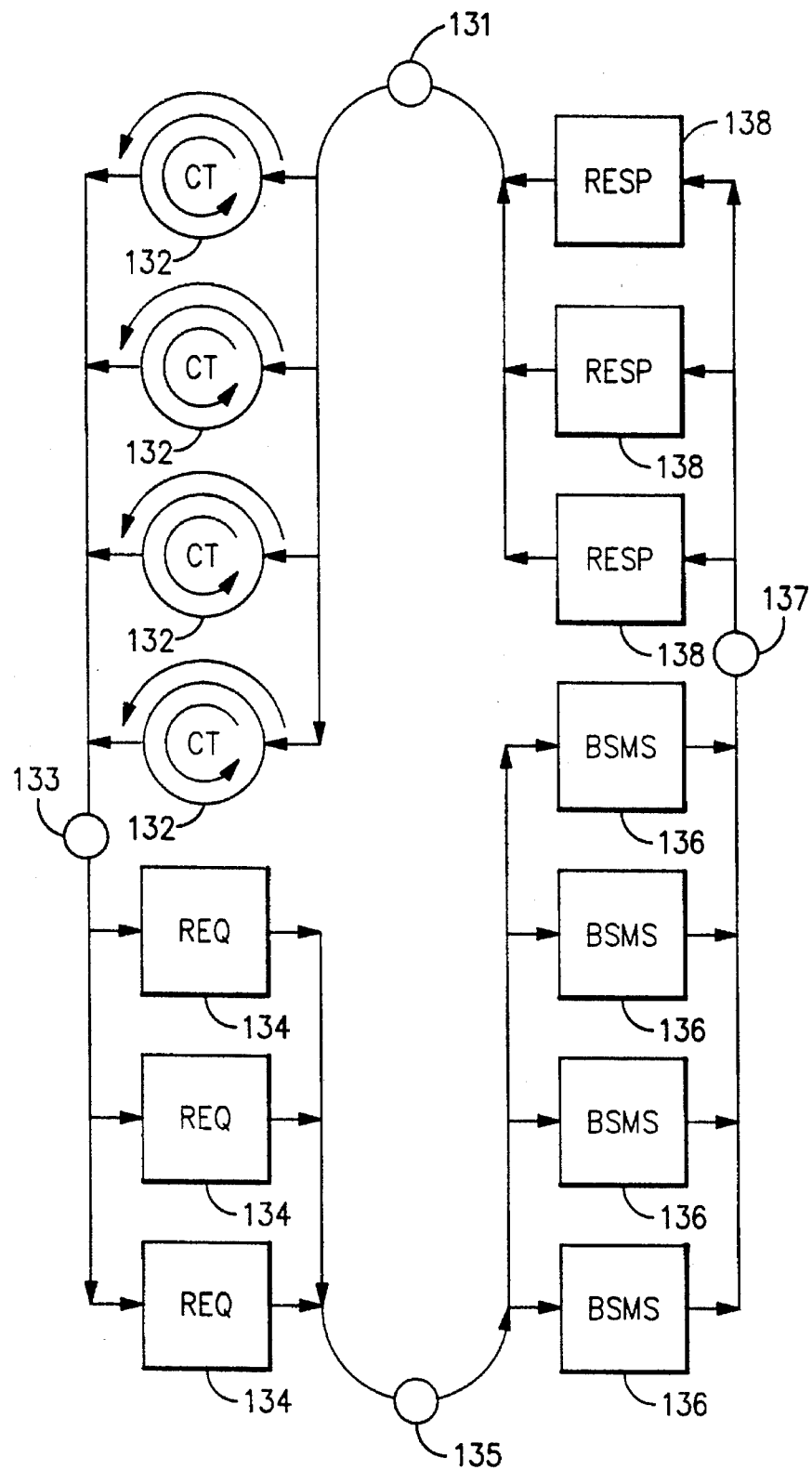
FIG. 13 is a block diagram which conceptually illustrates the length of a round trip path from any processor through any basic memory module and back to the same processor.

FIG. 13 illustrates a particular feature of the invention which may be described as relativistic clocking, in contrast to absolute clocking as used in the prior art. In FIG. 13, the processors 132 are shown above request switches 134 in stack A, while the BSMs 136 are shown below the respond switches 138 in stack B, in contrast to the arrangement shown in FIG. 12. It will be understood, however, that these two arrangements are fully equivalent. "CT" in FIG. 13 means processor cycle time, The arrangement assumes that the total loop delay is an integral number of cycle times, meaning that if a clock pulse is inserted at sync point 131, it will propagate around in the loop an integral number of processor cycle times. This may require in a specific implementation the insertion of a small delay in the loop circuit to account for a fractional cycle time in the loop propagation time. The arrangement in FIG. 13 also assumes that parallel delays are equal. This means that a clock pulse inserted at sync point 131 will propagate through any of the processors 132 and arrive at sync point 153 at the same time. Similarly, a clock pulse at sync point 133 will propagate through any of request switches 134 and arrive at sync point 135 at the same time, and a clock pulse at sync point 135 will propagate through any of BSMs 136 and arrive at sync point 137 at the same time. Finally, the arrangement shown in FIG. 13 assumes that there is at least one absolute sync point. This may be, for example, sync point 131.

The arrangement just described reduces the packaging delay in the memory latency path by approximately one half over a package using a more conventional "card-on board" (COB) or "bookcase" design if the same packing density assumptions are made for each case and also reduces the effects of clocking skews and latency. It should be noted that the use of three edges for signal interconnections compared to one for COB or "bookcase" designs reduces the interconnect density for the same number of I/Os or, alternatively, increases the I/Os usable for the same interconnect density. This is an important advantage, since the demands for more hardware at higher performance are forcing designs from area array connections on modules to edge connections for high density packaging. Note that, for the example described, a 16 processor cluster only uses two of the ECM's wirable edges. The two opposite edges are used for connections within the local cluster, exemplified by processors 00–15, switch 0 and BSMs 00–31 shown in FIG. 11. Interconnections to other clusters use the third edge of the ECM, shown as global wiring connections 106 in FIG. 10.

Figure 14:
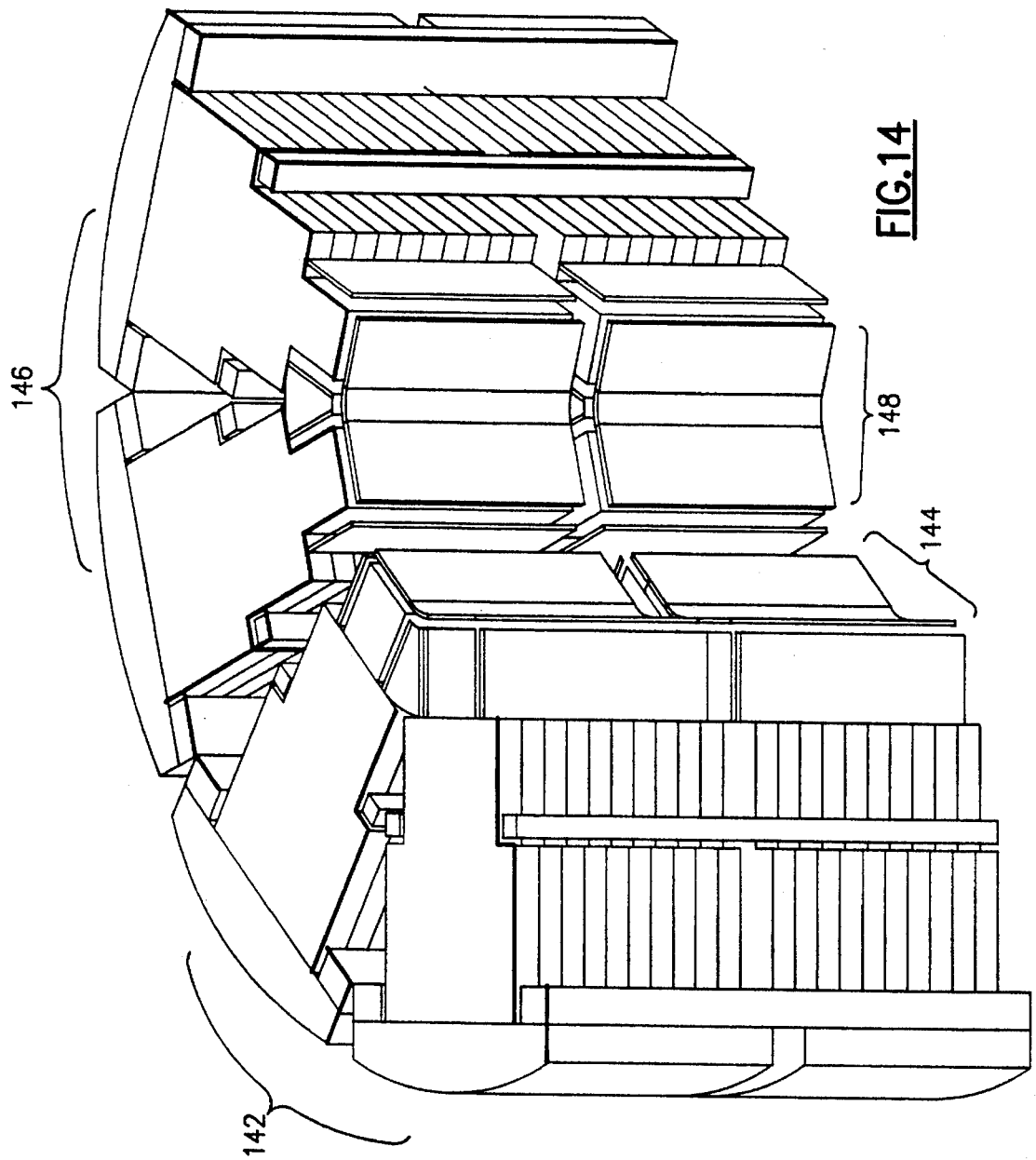
FIG. 14 is an isometric view showing four double stacks which provide a 64-way system, or one side of a full system, for the example illustrated in FIG. 11.
Figure 15:
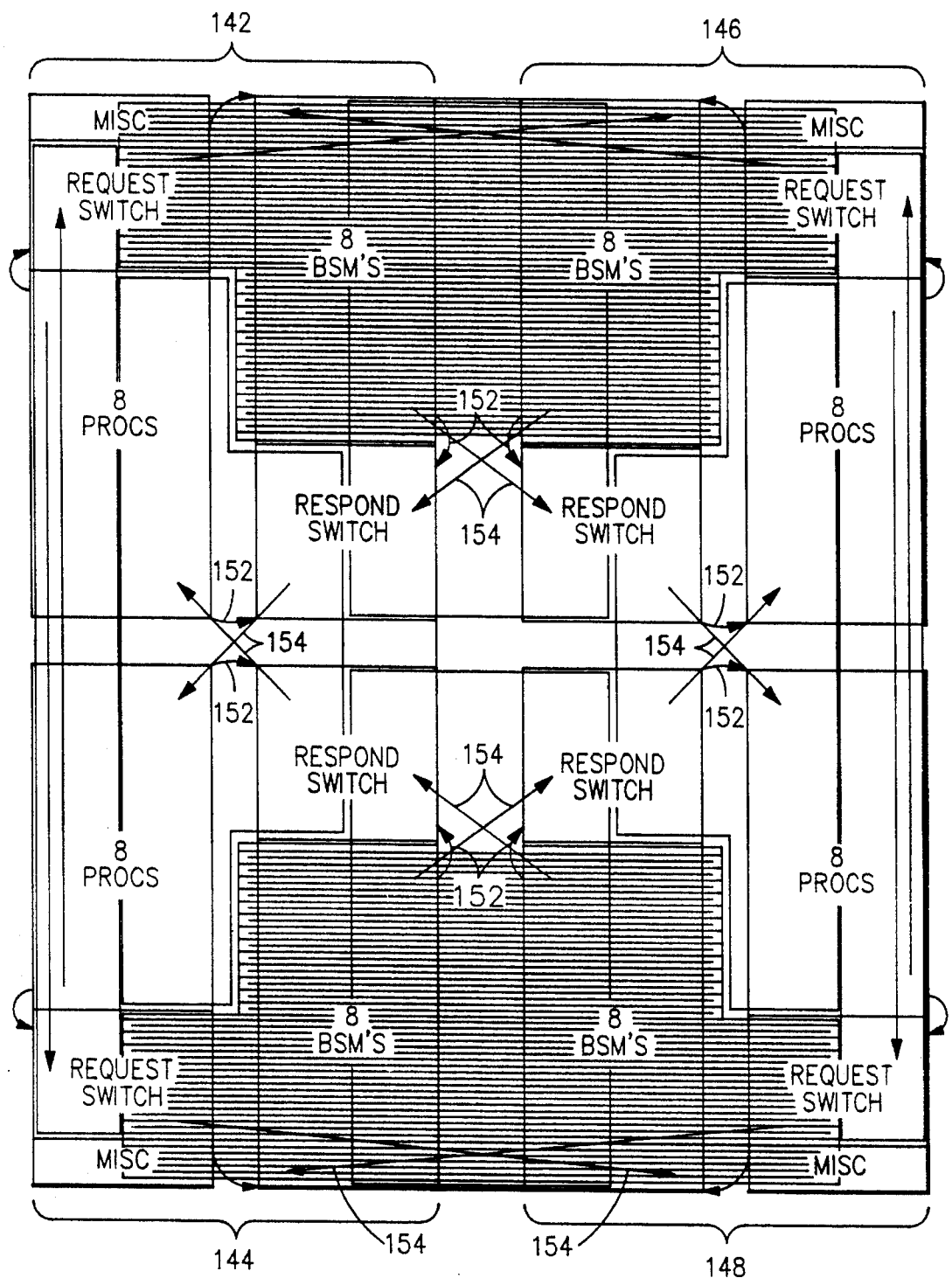
FIG. 15 is a block diagram illustrating the physical interconnection schematic of the example shown in FIG. 11.

To achieve a 64-way system, or one side of a full system in a specific implementation, four sixteen-way clusters are arranged together with their global faces forming a 2×2 array, by stacking vertically and horizontally, as shown in FIG. 14. More specifically, as previously described with reference to FIG. 10, a sixteen-way cluster is formed by a joined pair 102. Thus, in FIG. 14, a first joined pair 142 is stacked above a second joined pair 144 and a third joined pair 146 is stacked above a fourth joined pair 148, with the stacked joined pairs 146 and 148 immediately adjacent stacked joined pairs 142 and 144. Interconnect buses on the global faces are shown in FIG. 15, where the curved arrows 152 represent the local connections within the 16-way clusters 142, 144, 146, and 148 and the straight arrows 154 represent the global buses between clusters. It can be seen that the system schematic of FIG. 11 corresponds with the physical interconnection schematic of FIG. 15. FIG. 15 graphically illustrates the "mirrored" images of the vertically and horizontally stacked joined pairs; however, it should be understood that these "mirror images" do not require different ECMs. Rather, the ECMs of one joined pair are merely connected upside down from the other joined pair, thus greatly saving manufacturing and inventory costs in the manufacture of a computer. FIG. 15 also shows how the regular structure of the interconnect buses permits a simple wiring scheme. This regular structure allows the cables to be replaced in most cases by a rigid/flex board structure, for example a "multi-wire board", sometimes known as an "encapsulated circuit board" or ECB.

Figure 16:
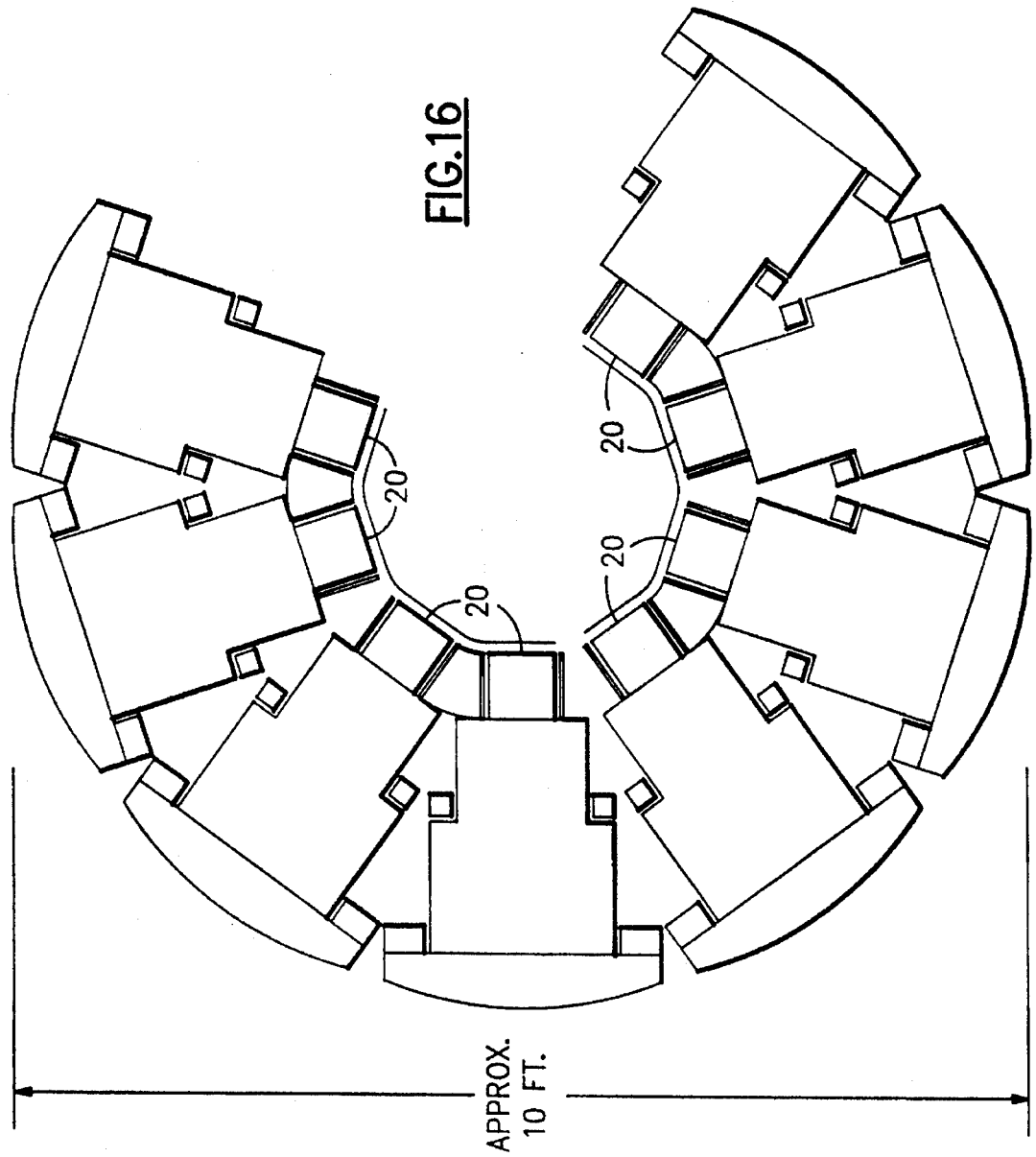
FIG. 16 is a top view of the computer system illustrating the overall footprint of the 128-way system with 128 Gbytes of tightly coupled main memory.

The overall footprint of a 128-way system with 128 Gbytes of tightly coupled main memory is shown in FIG. 16. It can be seen that the ECMs 20 containing the logic and memory are close together, with all the global wiring occurring on the inner arc and the massive utility functions (power supplies and cooling distribution) filling the much larger outer arc. The dimension shown is based on a typical package design of system and technology assumptions including chip circuit and bit density, power distribution and cooling capability, power supply volumetric efficiency (including cooling) and interconnection densities at all levels. The packaging principles described, however, are virtually independent of technology capabilities, and the specific system illustrated may be varied over a wide range.

While the invention has been described in terms of a single preferred embodiment, those skilled the art will recognize that the invention can be practiced with modification within the spirit and scope of the appended claims.

Having thus described my invention, what I claim as new and desire to secure by Letters Patent is as follows:

1. A machine design for a high performance computer system which minimizes latency between many high performance processors and a large amount of shared memory comprising:

a plurality of generally rectangular edge-connected modules, each of said edge connected modules being characterized by signal input/output pads on three edges, first and second opposing edges being referred to as inside connector edges and a third edge being referred to as a global connector edge, said edge-connected modules being configured as processor edge-connected modules, basic storage module edge-connected modules, and request and response switch edge-connected modules;

a group of processor edge-connected modules and a group of request or respond switch edge-connected modules stacked in a first stack, and a group of basic storage module edge-connected modules and a group of respond or request switch edge-connected modules stacked in a second stack;

said first and second stacks being arranged adjacent one another as a subsystem wherein said first stack comprises the group of request or respond switch edge connected modules above or below the group of processor edge-connected modules, and wherein said second stack comprises the group of respond or request switch edge-connected modules below or above the group of basic storage module edge-connected modules, said first and second stacks being further arranged so that the group of respond or request switch edge-connected modules of the second stack are adjacent the group of processor edge-connected modules of the first stack and the group of request or respond switch edge-connected modules of the first stack are adjacent the group of basic storage module edge-connected modules of the second stack to form a first joined pair comprising a joined pair of stacks having processor modules connected to request switch modules connected to basic storage modules connected to respond switch modules connected back to said processor modules in a first loop;

data flow from a processor in said first stack through one of said request switches to an addressed basic storage module in said second stack and through one of said respond switches back to the processor being unidirectional about said first loop defined by connections on the inside edges of the edge-connected modules, parallel delay times within groups being equal, said modules being arranged about said loops so that propagation time of data flow about said first loop is an integral number of processor cycle times;

a second joined pair which is a mirror image of said first joined pair; and wherein first and second joined pairs are stacked adjacent one another, said machine design further comprising global connectors interconnecting said first and second joined pairs via the third edges of the edge-connected modules via a second loop, the global connectors allowing processors of one joined pair to be connected to request switch modules in either said first or second joined pair, to be connected to basic storage modules of said second joined pair to be connected to respond switch modules in either said second or first joined pair, to be connected back to said processor modules in said first joined pair in said second loop while minimizing connection wiring length.

2. The machine design for a high performance computer system as recited in claim 1 wherein said first and second joined pairs are stacked horizontally.

3. The machine design for a high performance computer system as recited in claim 1 wherein said first and second joined pairs are stacked vertically.

4. A machine design for a high performance computer system as recited in claim 1 wherein first and second joined pairs being mirror images of one another are stacked vertically adjacent one another and third and fourth joined pairs being mirror images of one another are stacked vertically adjacent one another, said third and fourth joined pairs being a mirror image of said first and second joined pairs and stacked horizontally to said first and second joined pairs, said machine design further comprising means interconnecting said first, second, third, and fourth joined pairs via the global connectors connected to the third edges of the edge-connected modules, the global connectors allowing processors of one joined pair to be connected to basic storage modules of another joined pair while minimizing connection wiring length.

5. The machine design recited in claim 4 wherein said first, second, third, and fourth joined pairs comprise one side of a complete system, said machine design further comprising:

a second side identical to said one side; and interside switch means interconnecting the request and respond switch modules of said one side with request and respond switch modules of said second side.

6. The machine design for a high performance computer system recited in claim 1 wherein each of said edge-connected modules is provided with a dedicated power supply, an edge-connected module and its power supply being substantially coplanar and forming a field replaceable unit, said machine design comprising opposing pairs of connector guides for receiving said inside connector edges of said edge-connected modules.

7. The new machine design for a high performance computer system recited in claim 6 further comprising printed circuit boards to which are mounted said opposing pairs of connector guides, said printed circuit boards carrying wiring connections between modules within a stack and at least part of wiring connections between said first and second stacks.

8. The new machine design for a high performance computer system recited in claim 7 further comprising cooling means for each of said edge connected modules and wherein in said dedicated power supply includes cooling manifold means for supplying coolant to said cooling means, said manifold being coupled to a source of coolant when said field replaceable unit is inserted so that said opposing pairs of connector guides receive said inside connector edges of said edge-connected modules.

9. The machine design for a high performance computer system as recited in claim 6 wherein said dedicated power supply interconnects with high voltage bus means when said field replaceable unit is inserted so that said opposing pairs of connector guides receive said inside connector edges of said edge-connected modules.

10. The machine design for a high performance computer system as recited in claim 9 further comprising cooling means for each of said edge connected modules and wherein in said dedicated power supply includes cooling manifold means for supplying coolant to said cooling means, said manifold being coupled to a source of coolant when said field replaceable unit is inserted so that said opposing pairs of connector guides receive said inside connector edges of said edge-connected modules and said power supply interconnects with said high voltage bus.

11. A machine design for a high performance computer system as recited in claim 1 wherein said loop includes an absolute sync point and another sync point spaced from said absolute sync point in said loop intermediate said processor modules and said basic memory modules, and delay means inserted in said loop such that a clock pulse inserted at said absolute sync point will propagate through any of said processors and arrive at said other sync point at the same time, and a clock pulse inserted at said other sync point will propagate through any of said basic memory modules and arrive at said absolute sync pulse at the same time.

12. A machine design for a high performance computer system which minimizes latency between many high performance processors and a large amount of shared memory comprising:

a plurality of generally rectangular edge-connected modules, each of said edge connected modules being characterized by signal input/output pads on three edges, first and second opposing edges being referred to as inside connector edges and a third edge being referred to as a global connector edge, said edge-connected modules being configured as processor edge-connected modules, basic storage module edge-connected modules, and request and response switch edge-connected modules;

a plurality of stacks of modules, each stack comprising a group of processor edge-connected modules, a group of request switch edge-connected modules, a group of basic storage module edge-connected modules, and a group of respond switch edge-connected modules;

said groups being arranged within each of said stacks such that said group of processor modules is separated on one end from said basic storage modules by said group of respond switch modules and on the other end from said basic storage modules by said group of said request switch modules so that data flow from a processor through a request switch to an addressed basic storage module and through a respond switch back to the processor is unidirectional about a first loop defined by connections on the inside edges of the edge-connected modules; and said groups being further arranged about said loop so that parallel delay times within groups is equal, and propagation time about said first loop is an integral number of processor cycle times, each of said stacks being interconnected with the other stacks of modules via global wiring connected to global connector edges of said modules in a second loop such that processor modules in said first stack are connected to request switch modules which are connected in turn to basic storage modules in one of said other stacks which are connected in turn to respond switch modules which are connected in turn back to said processor modules in said first stack, each stack being a mirror image of the adjacent stack so as to minimize said global wiring.

13. The machine design for a high performance computer system as recited in claim 12 wherein said basic storage module edge-connected modules each comprise:

a substrate having first and second planar surfaces, said first planar surface having a plurality of chip connection sites and said second planar surface having a plurality of power connection pads; and a plurality of film carrier means connected in an array to said first planar surface at said chip connection sites, each of said film carrier means mounting a plurality of memory array chips along a first axial half thereof and decoupling capacitors along a second axial half thereof, said film carrier means being folded in half for connection of opposite edges thereof to said chip connecting sites.

14. The machine design for a high performance computer system as recited in claim 13 wherein said film carrier means are folded to expose said memory array chips with said memory array chips on alternate film carrier means being oppositely directed, said basic memory module edge-connected module further comprising cooling hat means having a plurality if longitudinal cavities, each of said cavities receiving a pair of said film carrier means so that exposed memory array chip means are in thermal contact with opposite walls of the cavity.

15. The machine design for a high performance computer system recited in claim 14 wherein each of said edge-connected modules is provided with a dedicated power supply, an edge-connected module and its power supply being substantially coplanar and forming a field replaceable unit, said machine design comprising opposing pairs of connector guides for receiving said inside connector edges of said edge-connected modules.

16. The new machine design for a high performance computer system recited in claim 15 further comprising printed circuit boards to which are mounted said opposing pairs of connector guides, said printed circuit boards carrying wiring connections between modules within said stack.

17. A machine design for a high performance computer system as recited in claim 12 wherein said loop includes an absolute sync point and another sync point spaced from said absolute sync point in said loop intermediate said processor modules and said memory modules, and delay means inserted in said loop such that a clock pulse inserted at said absolute sync point will propagate through any of said processors and arrive at said other sync point at the same time, and a clock pulse inserted at said other sync point will propagate through any of said memory modules and arrive at said absolute sync pulse at the same time.

18. A machine design for a high performance computer system which minimizes latency between many high performance processors and a large amount of shared memory comprising:

stacks of generally rectangular edge-connected modules arranged in at least one set of joined pairs, each joined pair in said at least one set of joined pairs comprising a pair of joined stacks, each of said edge connected modules being characterized by signal input/output pads on three edges, first and second opposing edges being referred to as inside connector edges and a third edge being referred to as a global connector edge, said edge-connected modules being configured as processor edge-connected modules, basic storage module edge-connected modules, and request and response switch edge-connected modules;

a group of processor edge-connected modules and a group of request or respond switch edge-connected modules stacked in a first stack of each joined pair, and a group of basic storage module edge-connected modules and a group of respond or request switch edge-connected modules stacked in a second stack of each joined pair;

said first and second stacks of each joined pair being arranged adjacent one another with the group of request or respond switch edge connected modules above or below the group of processor edge-connected modules in said first stack and the group of respond or request switch edge-connected modules below or above the group of basic storage module edge-connected modules in said second stack so that the group of respond or request switch edge-connected modules are adjacent the group of processor edge-connected modules of the first stack and the group of request or respond switch edge-connected modules are adjacent the group of basic storage module edge-connected modules of the second stack to form a first joined pair of said one set of joined pairs, said first joined pair comprising a pair of joined stacks having processor modules connected to request switch modules connected to basic storage modules connected to respond switch modules connected back to said processor modules in a first loop;

connection means connecting processors in said first stack of said first joined pair through said request switches to addressed basic storage modules in said second stack of said first joined pair and through said respond switches back to the processor providing a data flow path being unidirectional about said first loop defined by connections on both inside edges of the edge-connected modules;

a second joined pair in said at least one set of joined pairs which is a mirror image of said first joined pair; and wherein first and second joined pairs of said at least one set of joined pairs are stacked adjacent one another;

global connectors interconnecting said first and second joined pairs to the third edges of the edge-connected modules, the global connectors allowing processors of said first joined pair to be connected to request switch modules of either said first or second joined pair, to in turn be connected to basic storage modules of said second joined pair, to in turn be connected to respond switch modules of either said first or second joined pair, to in turn be connected back to said processor of said first joined pair in a second loop while minimizing connection wiring length in said interconnection means.

19. The machine design of claim 18 wherein said first and second joined pairs of said at least one set are stacked one on top of the other.

20. The machine design of claim 18 wherein said first and second joined pairs of said at least one set are stacked along side one another.

21. The machine design of claim 18 wherein there are two sets of joined pairs with the joined pairs in each set stacked along side one another, said two sets of joined pairs being stacked one on top of the other as mirror images of one another.

22. The machine design of claim 21 wherein said interconnection means interconnects the processors of each set to the basic storage modules of the other set via the global connectors connected to the third edges of the edge-connected modules.

* * * * *